APPARATUS FOR ASSEMBLING WORKPIECES

Filed Sept. 27, 1954 17 Sheets-Sheet 1

Inventors
Adolph S. Dorosz
Thomas W. Snow
By their Attorney
Thomas J. Ryan

Inventors
Adolph S. Dorosz
Thomas W. Snow
By their Attorney
Thomas J. Agaw.

APPARATUS FOR ASSEMBLING WORKPIECES

Filed Sept. 27, 1954 17 Sheets-Sheet 3

Inventors
Adolph S. Dorosz
Thomas W. Snow
By their Attorney
Thomas J. Ryan

Inventors
Adolph S. Dorosz
Thomas W. Snow
By their Attorney
Thomas J. Ryan

Inventors
Adolph S. Dorosz
Thomas W. Snow
By their Attorney
Thomas J. Ryan.

Dec. 4, 1956 A. S. DOROSZ ET AL 2,772,416

APPARATUS FOR ASSEMBLING WORKPIECES

Filed Sept. 27, 1954 17 Sheets-Sheet 6

Inventors
Adolph S. Dorosz
Thomas W. Snow
By their Attorney
Thomas J. Ryan

Inventors
Adolph S. Dorosz
Thomas W. Snow
By their Attorney
Thomas J. Ryan.

Inventors
Adolph S. Dorosz
Thomas W. Snow
By their Attorney
Thomas J. Ryan

Inventors
*Adolph S. Dorosz*
*Thomas W. Snow*
*By their Attorney*
*Thomas J. Ryan.*

Inventors
Adolph S. Dorosz
Thomas W. Snow
By their Attorney
Thomas J. Ryan

Inventors
Adolph S. Dorosz
Thomas W. Snow
By their Attorney
Thomas J. Ryan

APPARATUS FOR ASSEMBLING WORKPIECES

Inventors
Adolph S. Dorosz
Thomas W. Snow
By their Attorney
Thomas J. Ryan

Inventors
Adolph S. Dorosz
Thomas W. Snow
By their Attorney
Thomas J. Ryan

Inventors
Adolph S. Dorosz
Thomas W. Snow
By their Attorney
Thomas J. Ryan.

APPARATUS FOR ASSEMBLING WORKPIECES

Filed Sept. 27, 1954 17 Sheets-Sheet 15

Inventors
Adolph S. Dorosz
Thomas W. Snow
By their Attorney
Thomas J. Ryan.

Inventors
Adolph S. Dorosz
Thomas W. Snow
By their Attorney
Thomas J. Ryan

Inventors
Adolph S. Dorosz
Thomas W. Snow
By their Attorney
Thomas J Ryan.

United States Patent Office 2,772,416

Patented Dec. 4, 1956

2,772,416

APPARATUS FOR ASSEMBLING WORKPIECES

Adolph S. Dorosz, Beverly, and Thomas W. Snow, Melrose, Mass., assignors to United Shoe Machinery Corporation, Flemington, N. J., a corporation of New Jersey Application September 27, 1954, Serial No. 458,328

36 Claims. (Cl. 1—102)

This invention relates to apparatus for assembling work pieces in predetermined relation on a chassis. More particularly, the invention is concerned with assembling electrical equipment automatically, and is herein illustrated as embodied in a multi-station conveyor system for assembling electronic components on a printed wiring board. It will be recognized that in its various aspects the invention is not limited to the embodiment herein shown by way of example but is generally useful in assembling and/or processing a diversity of products.

The component inserting machine, herein shown as occupying a station of the illustrated apparatus, is of the same general type as that disclosed in an application filed June 14, 1954, in the names of Charles P. Cardani and Joseph Harrington, Jr., and bearing Serial No. 436,458. The novel features shown in connection with the improved component inserting machine disclosed herein are not here claimed but are fully described and claimed in a separate application.

At present electronic equipment is being assembled largely by hand. Increasing acceptance in the trade of standardized components and printed circuits or wiring boards, especially for radio and television sets, has advanced the need for an automatic assembling system. Mechanism for presenting work in the form of boards, panels, or other chassis to an article assembling or inserting machine should be of simple construction, certain in operation, and preferably operate automatically to supply and position the work with accuracy prior to the operation of the machine. These considerations bear even more emphatically when a wiring board, for example, is adapted to be united with a plurality of small components systematically and is to be loaded on a carrier and moved from one machine to another to receive their successive, precise installations or other treatment. It is an object of this invention, therefore, to provide an automatic assembly system and method capable of assuring a high production rate, the products thereof having improved uniformity and reliability.

In keeping with the object just stated and as a feature of the invention, there is provided, in combination with a series of stations arranged and adapted to operate to apply components and/or effect other processing, automatic means for simultaneously feeding wiring boards singly from one station to the next, said boards being adapted to receive the particular component or treatment to be applied by the instrumentalities of a station, automatic mechanism at each station for predeterminedly positioning and holding the individual board assemblies with respect to the operating instrumentalities of the several stations, and means responsive to actuation of said mechanism for operating said stations.

As herein shown and for purposes of obtaining precision assembly the wiring boards are respectively positioned on special flat pallets which are carried horizontally in the direction of feed by spaced continuously operative endless conveyor belts, the loaded pallets being automatically disassociated from the belts upon arrival at each station and held clamped during the non-feeding interval in which the stations of the series are operated. More particularly the novel pallets of the system herein illustrated are each provided with a pair of pins for locating a board thereon, a pair of spaced pallet locating lugs which initially cooperate to space the boards heightwise in stacked relation, and with a projection arranged to trigger pallet positioning and clamping means at each station. Thus a pallet in the exemplary organization herein disclosed is arranged in traveling toward a station to be moved laterally so that its locating lugs are carried from a straight guide channel, and one of them is disposed to be engaged by an abutment fixing the lateral and longitudinal (i. e., in the direction of feed) position of the pallet at that station, this engagement being effected as the pallet is slowed at a station by the projection causing electrical means to signal for actuation of an arm of the clamping means to engage the pallet and bodily impart to the latter a component of movement transverse to the direction of feed. By means of a rise on a longitudinally extending member, the projection is cammed upwardly away from its adjacent feed belt as the pallet comes to rest, and the opposite side of the pallet from said projection is caused to be similarly elevated from its adjacent feed belt by engaging, during said transverse movement, a beveled guide rail also extending parallel to the direction of feed.

Although as illustrated herein the pallets are designed to serve as, and are properly construed to be, work supports, it will be apparent that the invention also contemplates use of the novel apparatus directly upon component-mounting chassis that are themselves independently fed, positioned, and clamped in the same manner as the pallets but without any need of the latter. This is to say that the work itself may, in effect, be considered to have been substituted for or become integral with the respective pallets, each chassis then being formed to ride directly on the conveyor belts and to carry its own locating lugs and trigger projection. When a chassis is thus provided with its own trigger projection and locating lugs, these formations may ultimately further function as means for locating and/or mounting the chassis in its housing. Thus, the apparatus may be operated without work-supporting pallets, for example, when the work pieces themselves are accurately formed, are not especially fragile, and have adequate rigidity and weight to insure satisfactory operation, whereas it will usually be preferable to employ pallets for mounting work pieces, such as chassis or wiring boards, of irregular configuration, or which are quite fragile and susceptible of inaccuracies in their dimensions or inconsistency in contour. It will be clear that both pallets and work pieces conveyed without pallets may vary considerably in length (i. e., in the direction of feed) if necessary, but that their width is limited to a dimensional range that is imposed by any particular conveyor design.

A further feature of the invention consists in the provision of means, in an automatic assembly system of the type above indicated, whereby the fact of arrival of all of the several loaded pallets at their respective stations and in their appropriate positions to be operated upon by the component applying machines is communicated to mechanism effecting substantially simultaneous operation of the machines. As herein shown, this signal means comprises a toggle switch of the double throw type actuated at each station by the pallet-triggered movement of the above-mentioned arm of the work clamping means. Closure of one portion of this switch in clamping a wiring board precedes closure of a second portion of this switch which effects energizing of a solenoid operated valve controlling the driving mechanism of the component applying machine at that station.

Another feature of the invention resides in novel mechanism for automatically depositing on to the conveyor at appropriate times a loaded pallet from a vertical stack in a chute or hopper for conveyance to the successive stations. As shown herein, this conveyor loading mechanism comprises means for holding a plurality of the pallets in superimposed relation, the pallets being supported above and substantially parallel to a reach of the conveyor belts but oblique to the direction of feed, and means including spaced pallet engaging tongues for turning only the bottom pallet relative to said holding means about an axis substantially normal to itself to effect its release to the belts and substantially in alinement with their direction of travel. Still another feature of the invention will be recognized in the provision, in combination with the conveyor loading means just indicated, of mechanism for automatically operating said bottom pallet releasing means upon completion of assembly of each wiring board to assure a continuous supply of boards for the feeding of the several stations.

The above and other features of the invention, including various safety provisions for assuring the production of high quality and fully complete assemblages, together with various novel details and arrangements of parts, will now be more fully described by reference to an illustrative apparatus in which the invention is embodied and in connection with the accompanying drawings thereof, in which Fig. 1 is a view in side elevation, with portions broken away, of the left-hand or loading end of the illustrative apparatus in which the invention is embodied and showing a first operating station in a series;

Fig. 1*a* is a view in side elevation, with portions broken away, of the right-hand, or driving and unloading end, of the illustrated apparatus shown in Fig. 1, a final one only of several operating stations also being shown;

Figure 2:
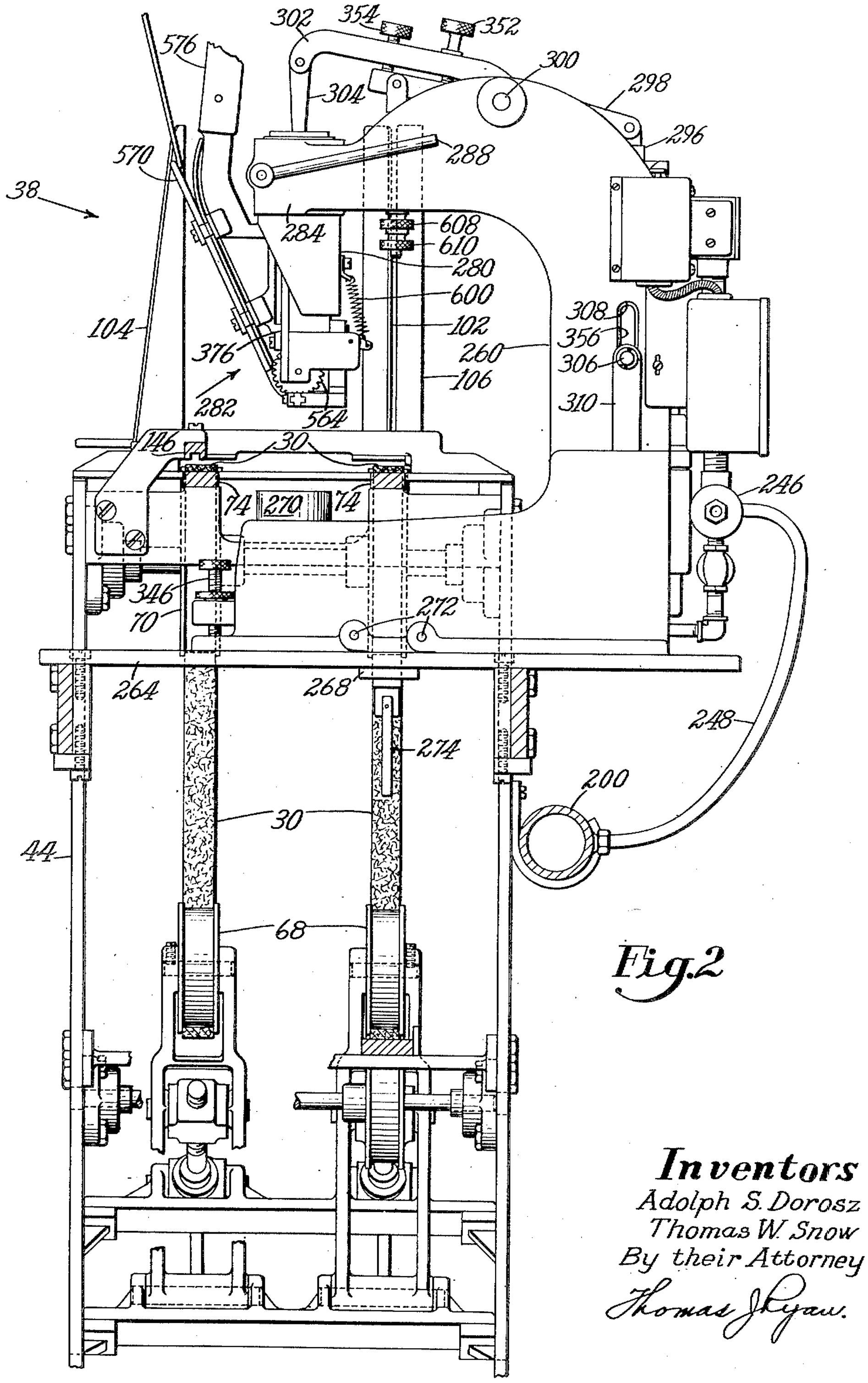
Fig. 2 is a vertical section on an enlarged scale and looking toward the left in Fig. 1 indicating the mounting of a component applying machine at one station.
Figures 8, 8A, 10:
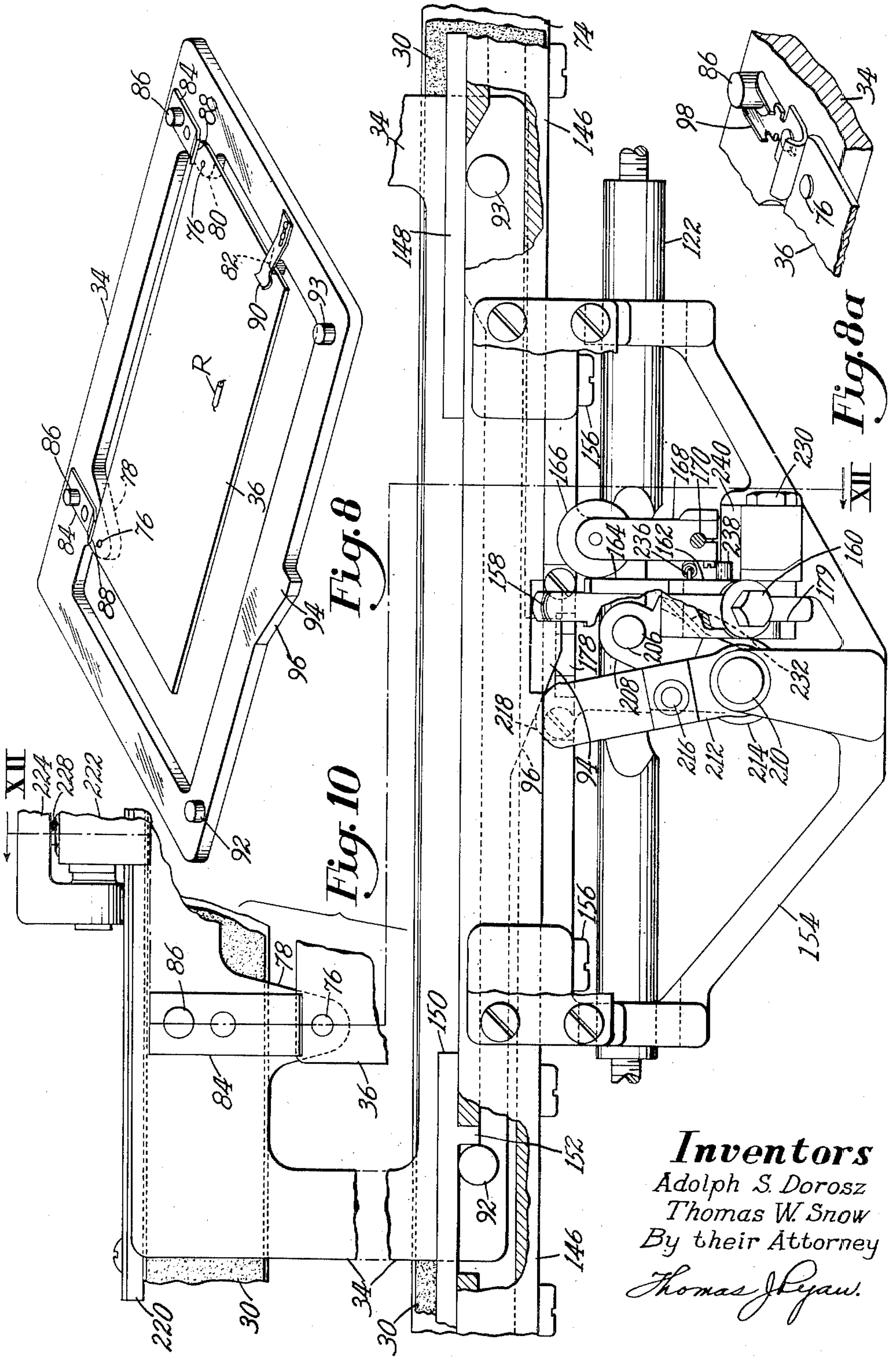
Fig. 8 is a perspective view of an isolated, loaded pallet, the wiring board having been operated upon by one component applying machine.
Figures 9, 9A:
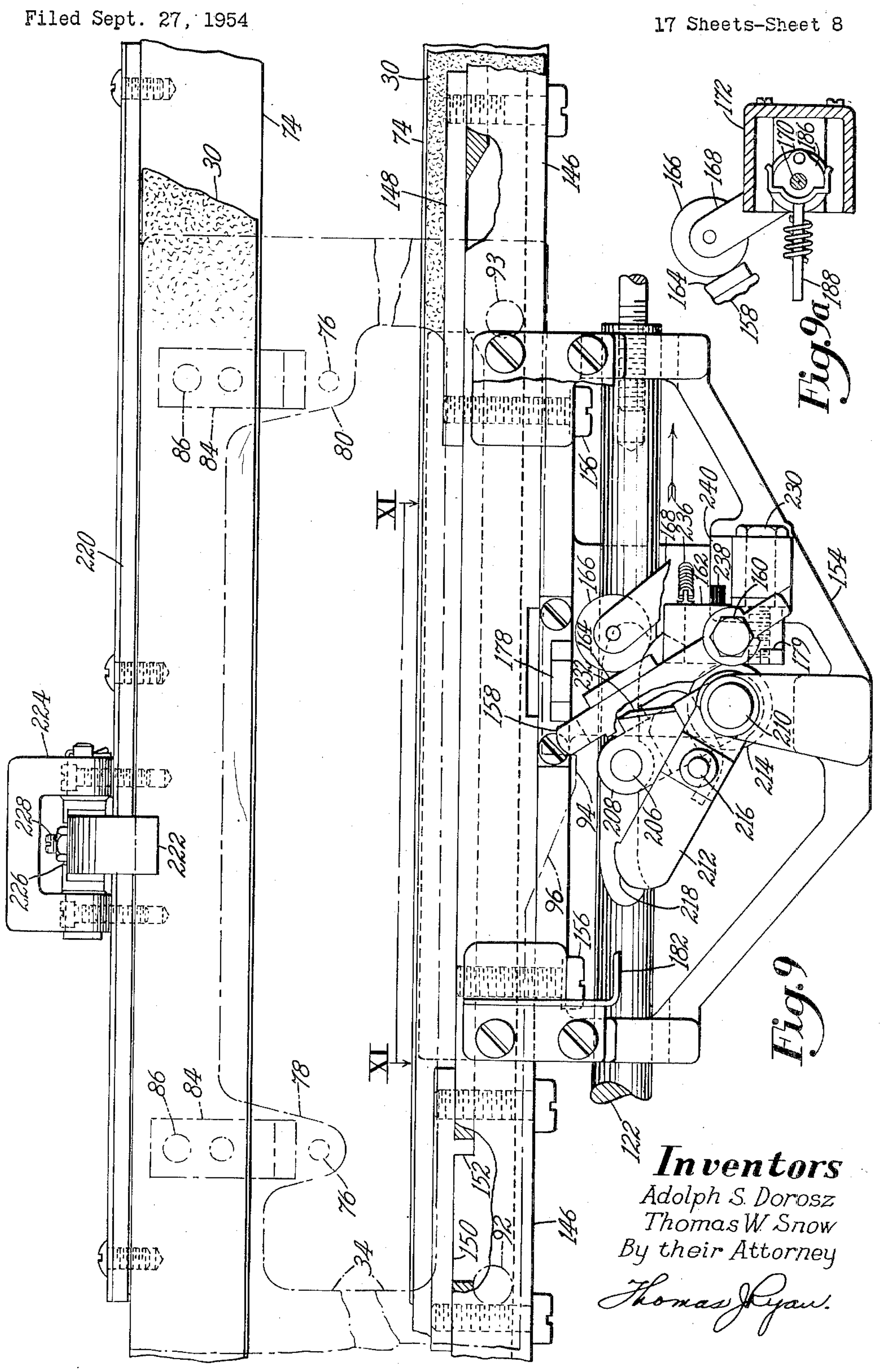
Figures 9B, 11, 12:
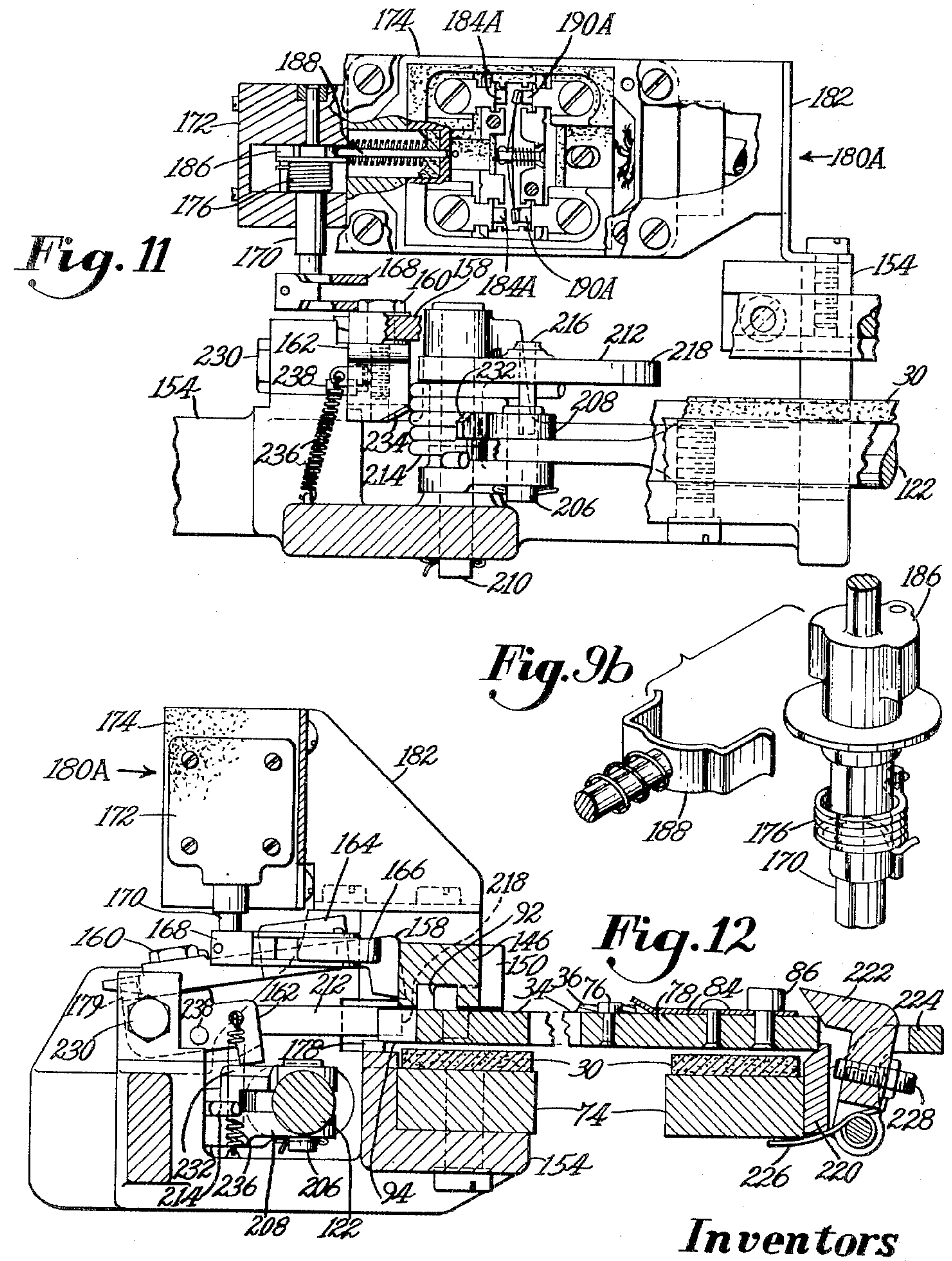
Figure 13:
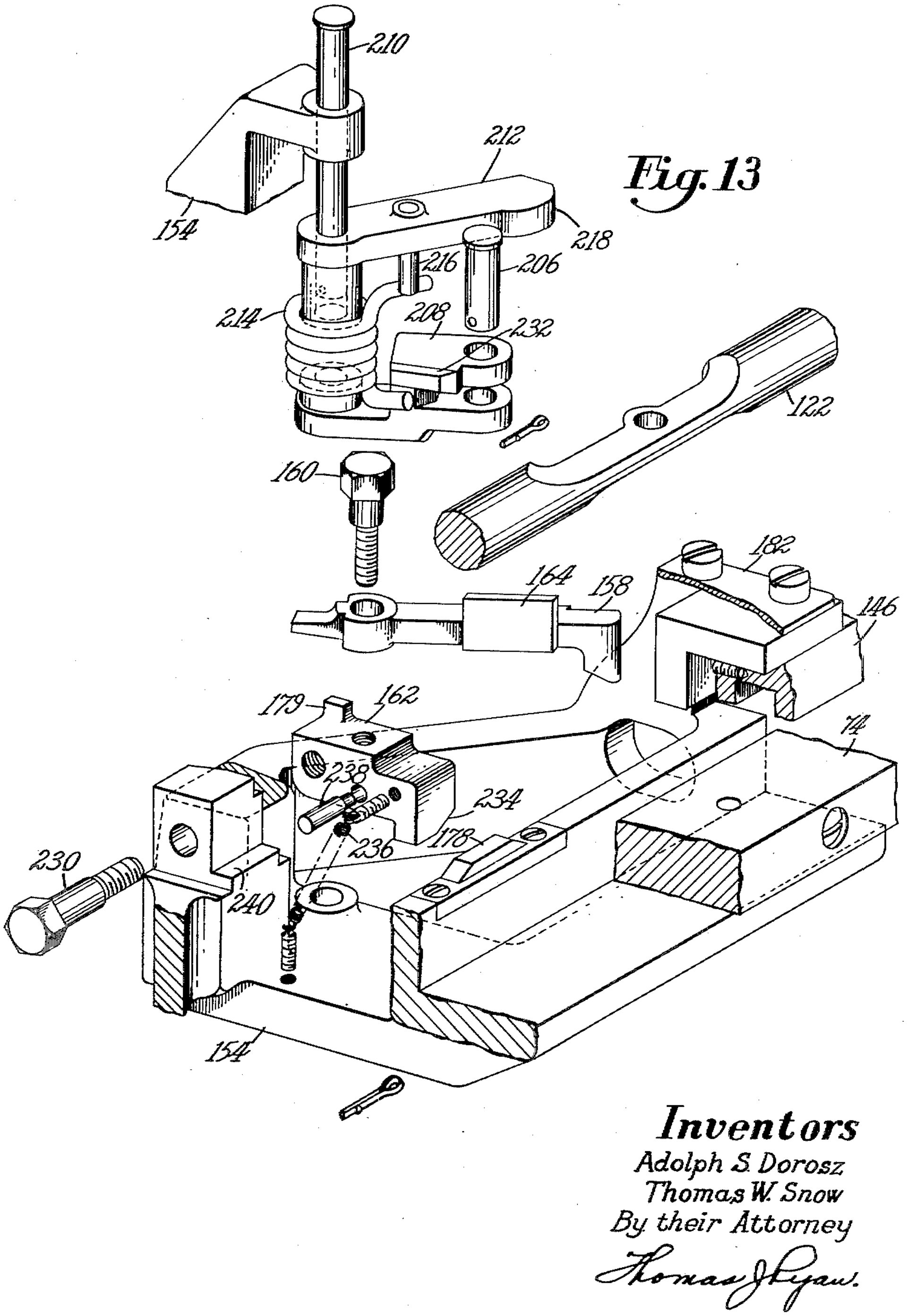
Figure 14:
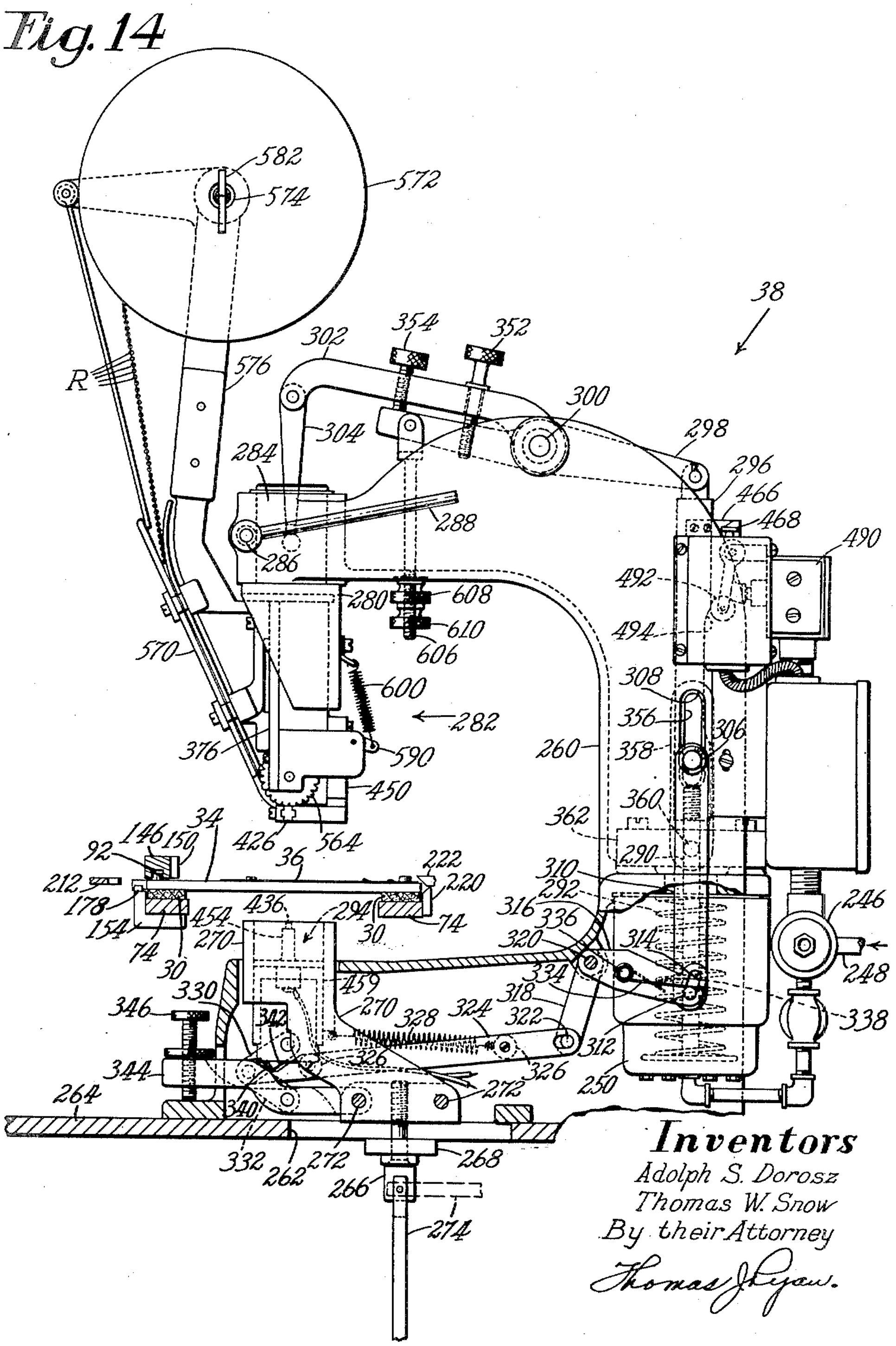
Figures 15, 16:
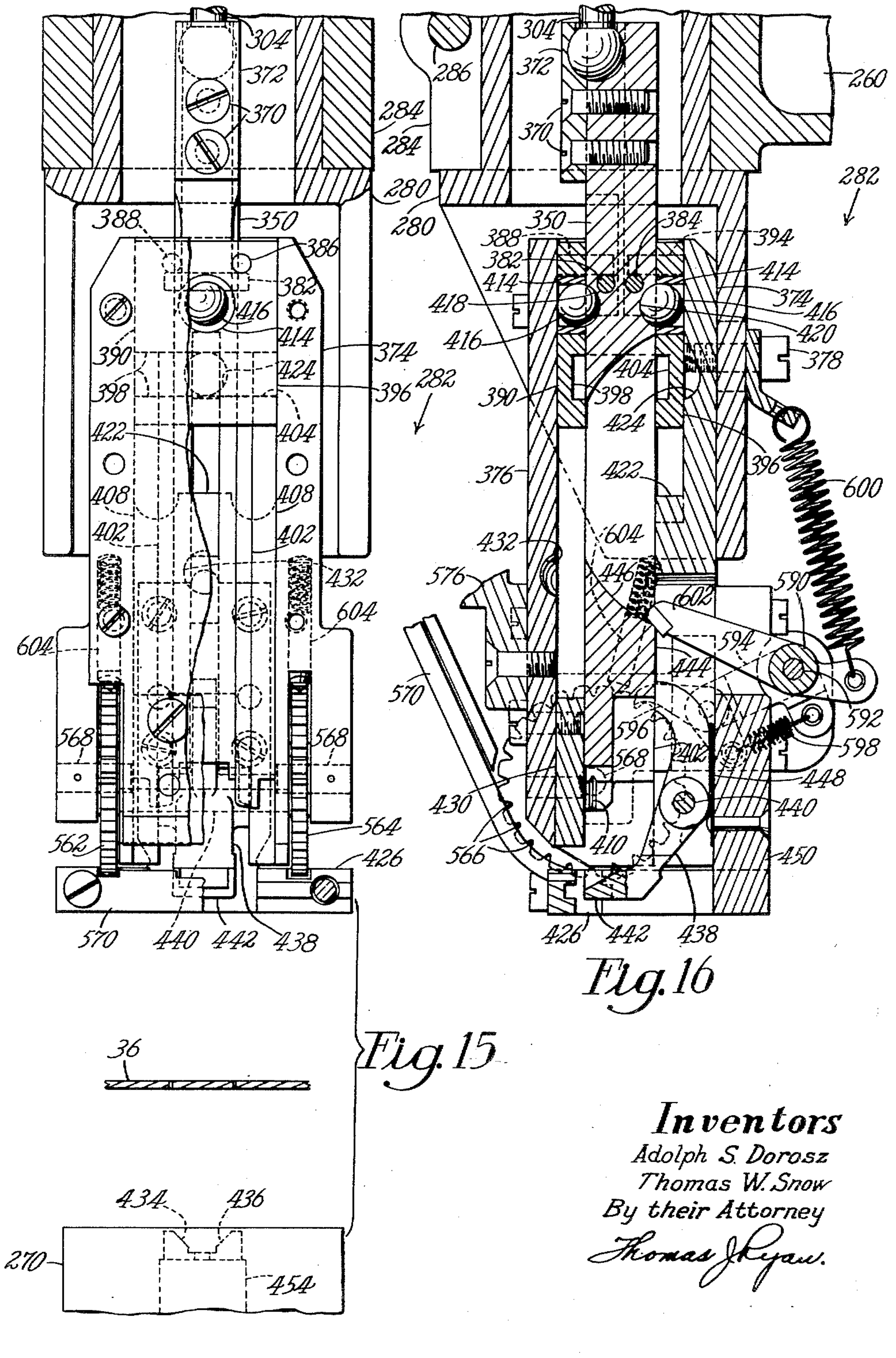
Figure 17:
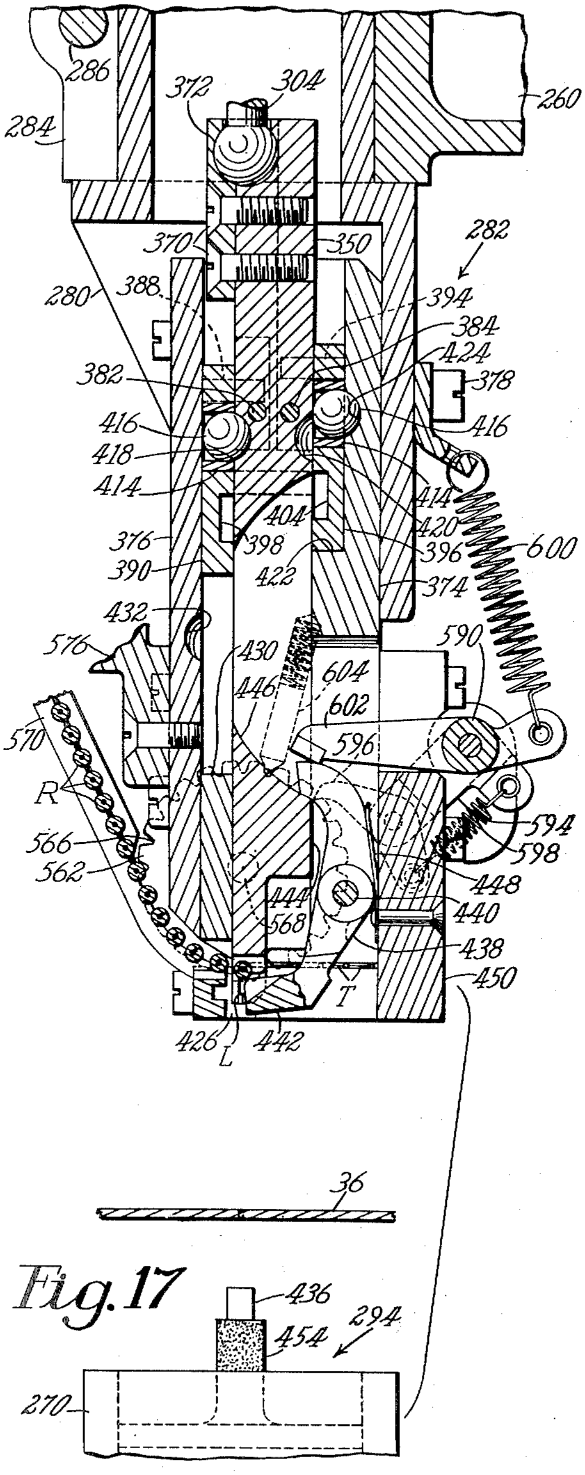
Figure 18:
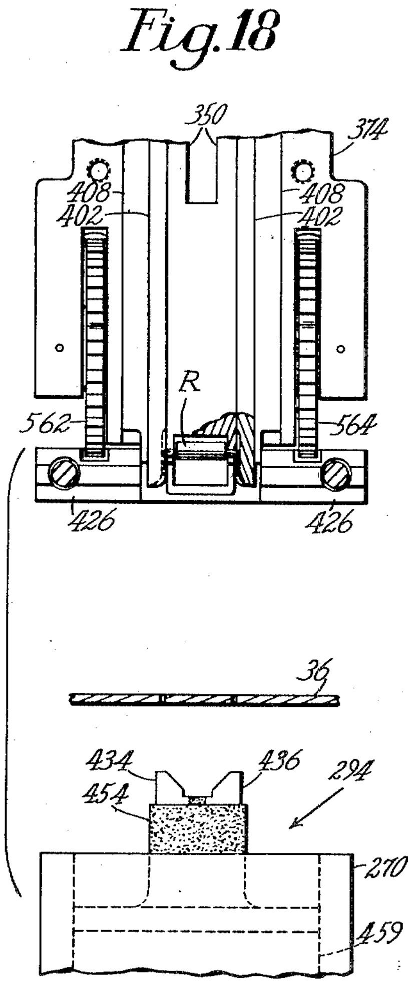
Figures 19, 20:
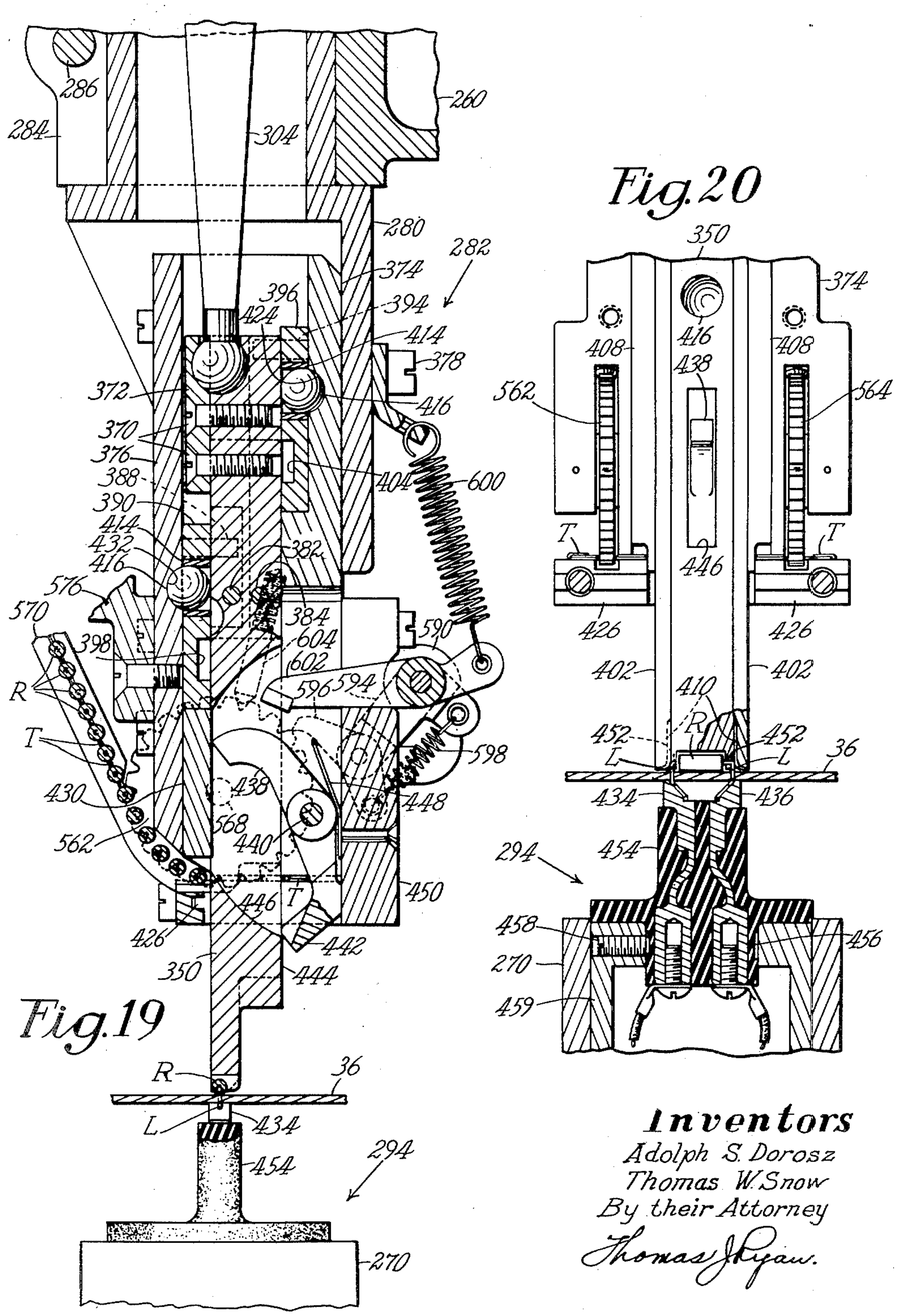
Figure 21:
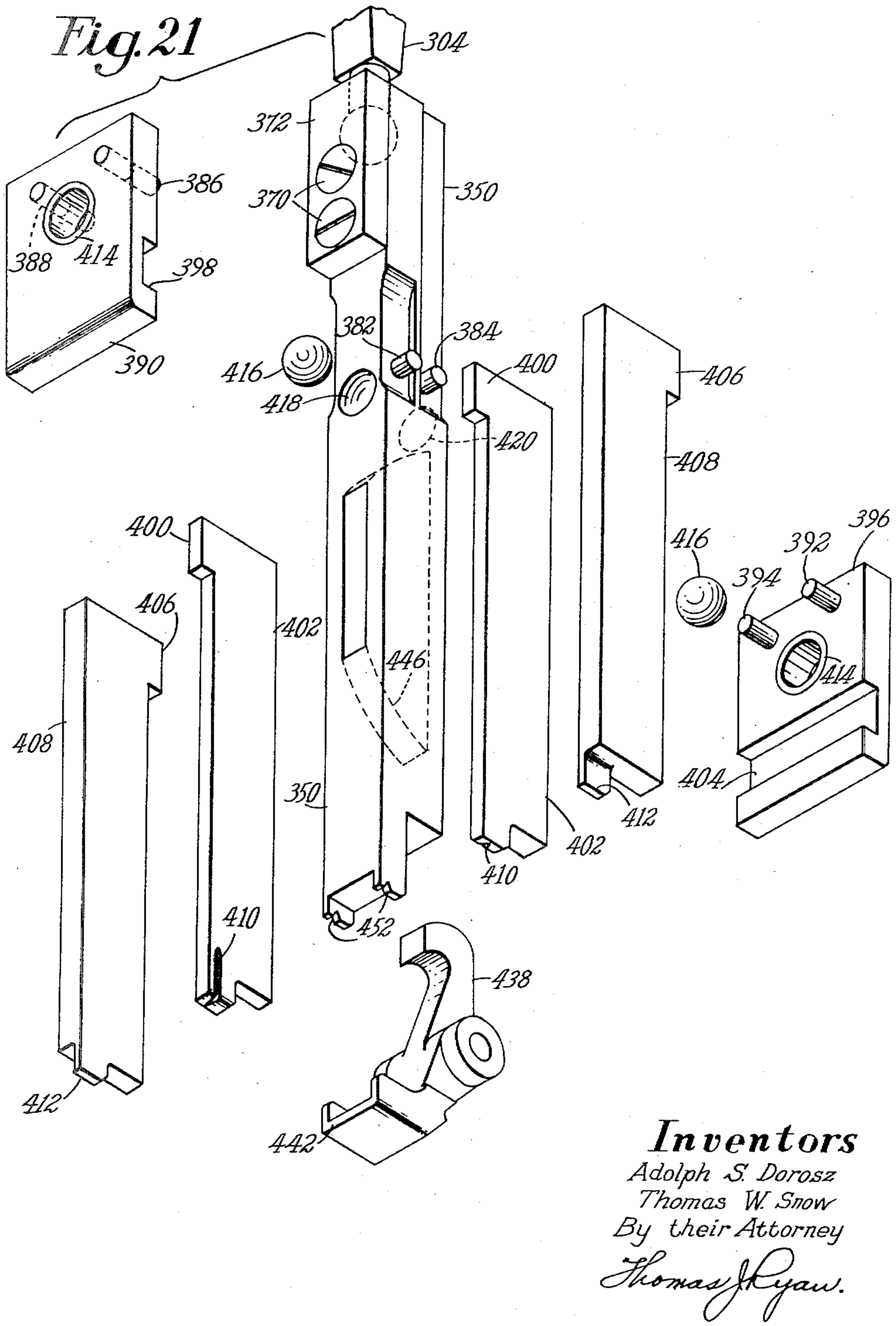
Figure 22:
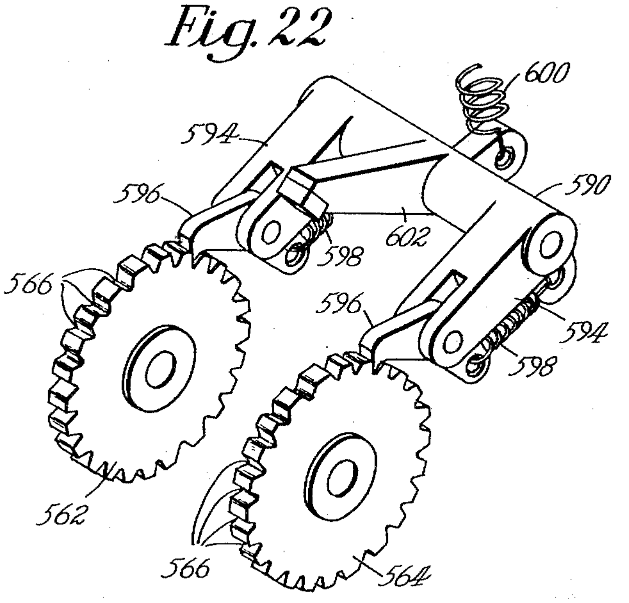
Figure 23:
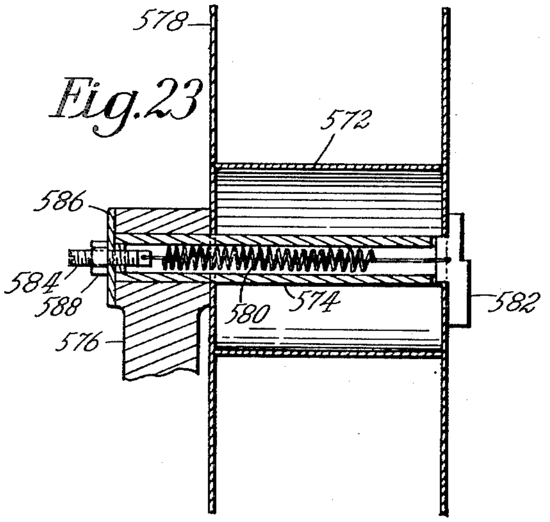
Figure 24:
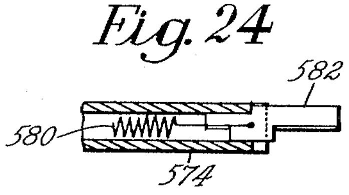
Figure 25:
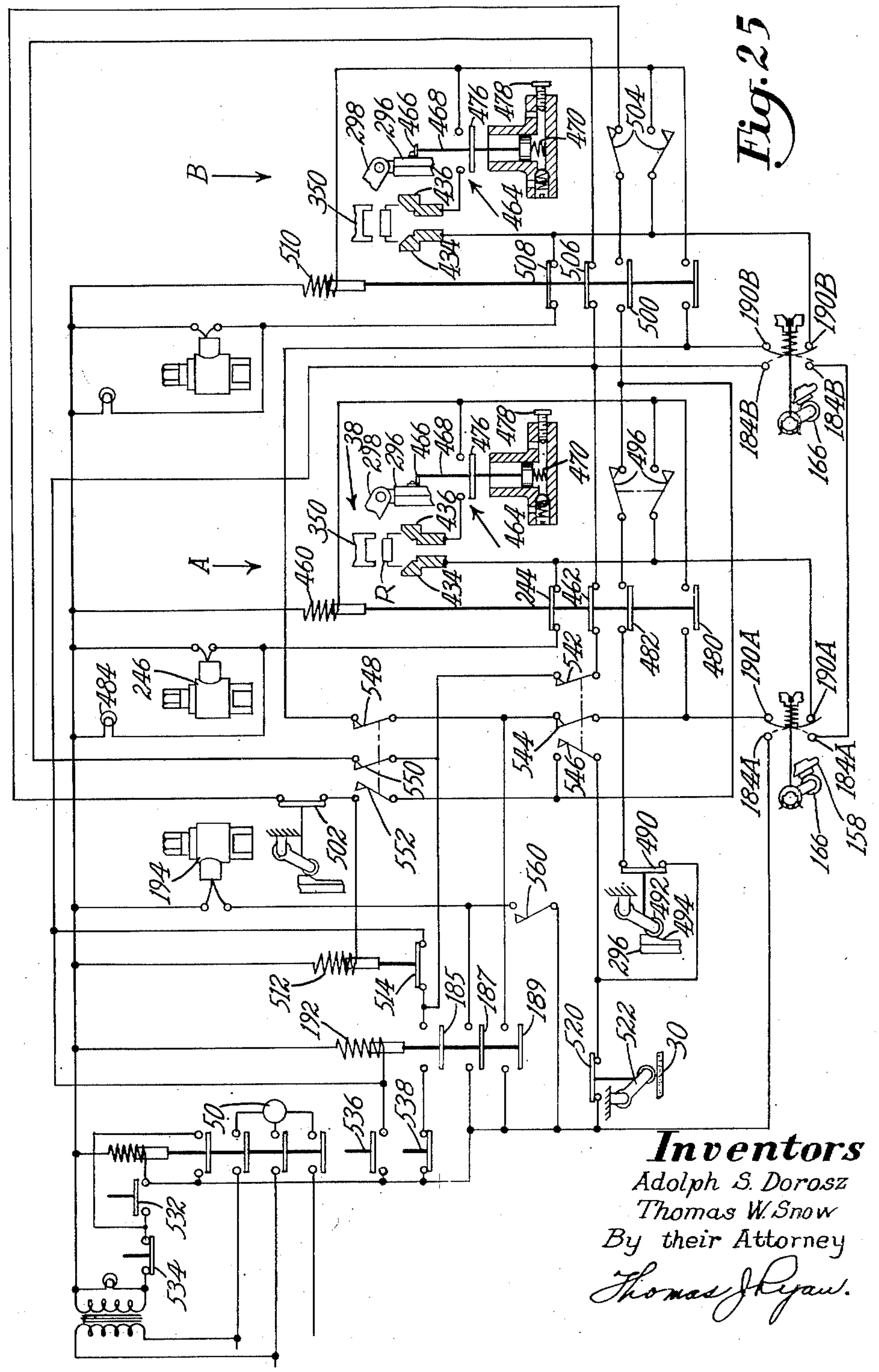

Fig. 8*a* is a perspective view of an alternate form of spring clip for detachably securing a wiring board on a pallet;

Fig. 9 is a plan view, with portions broken away, of work clamping and positioning means at an operating station, a loaded pallet being indicated by dash lines as just arriving thereat;

Figs. 9*a* and 9*b* are plan and perspective views, respectively, of switch operating parts actuated by mechanism shown in Fig. 9;

Fig. 10 is a view similar to Fig. 9 but showing the parts in their subsequent relative positions with the pallet stopped and clamped in position for the wiring board to be operated upon;

Fig. 11 is a view in elevation and partially in section looking in the direction of arrows marked XI—XI in Fig. 9 and showing parts of the mechanism seen in Figs. 9 and 10;

Fig. 12 is a section taken on the broken line XII—XII in Fig. 10 and looking in the direction indicated by arrows;

Fig. 13 is an exploded view of the work clamping and positioning parts seen in Figs. 9 and 10;

Fig. 14 is a view in side elevation of the component applying machine shown in Fig. 2, portions of the frame being broken away to show details of construction;

Fig. 15 is a view in front elevation, and partially in section, of the head of the machine shown in Fig. 14;

Fig. 16 is a vertical section of the machine head shown in Figs. 14 and 15;

Fig. 17 is a section similar to Fig. 16 but showing the operating parts at a later stage in their cycle of operation;

Fig. 18 is a front elevation of certain of the parts shown in Figs. 16 and 17;

Fig. 19 is a section similar to Figs. 16 and 17 but showing head operating parts at a still later stage in the cycle;

Fig. 20 is a side elevation, partly in section, showing anvil structure and the relative position of parts when in the stage indicated in Fig. 19;

Fig. 21 is an exploded view of the operating instrumentalities in the machine head shown in preceding figures;

Fig. 22 is a perspective view of parts of the component feeding mechanism associated with the machine head;

Fig. 23 is a vertical section illustrating the detachable mounting of a reel for supporting a supply of components;

Fig. 24 is a detail of parts shown in Fig. 23 but arranged to permit easy mounting or removal of the reel; and Fig. 25 is a schematic wiring diagram for two successive machine stations A and B only, while in rest or inoperative condition, i. e., their inserting instrumentalities are in "up" position and the conveyor as well as the loading and unloading stations are not supplied with pallets; similar parts at these stations may have like reference characters and suffixes A or B as appropriate to their station.

Figure 1:
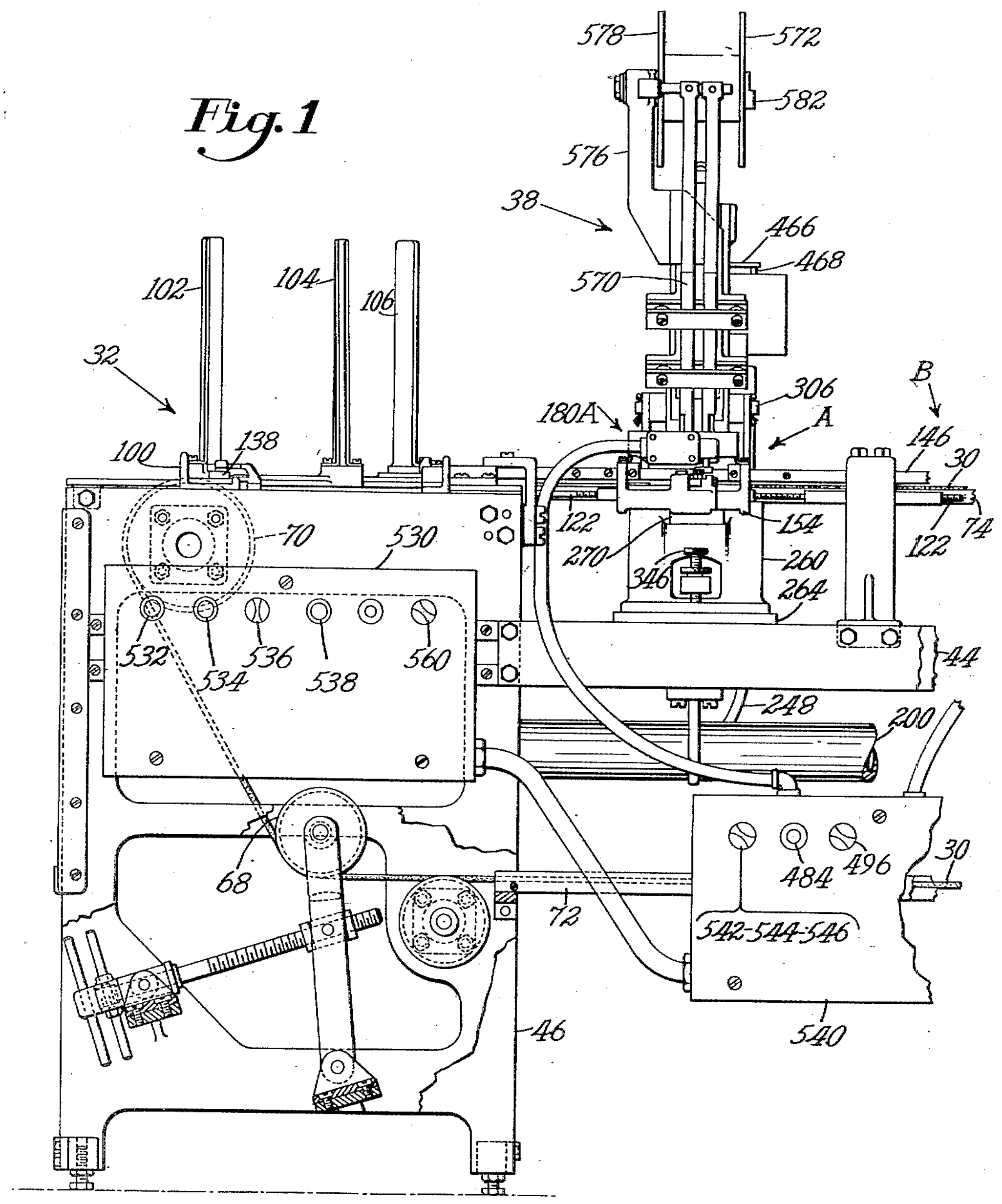
Figure 1A:
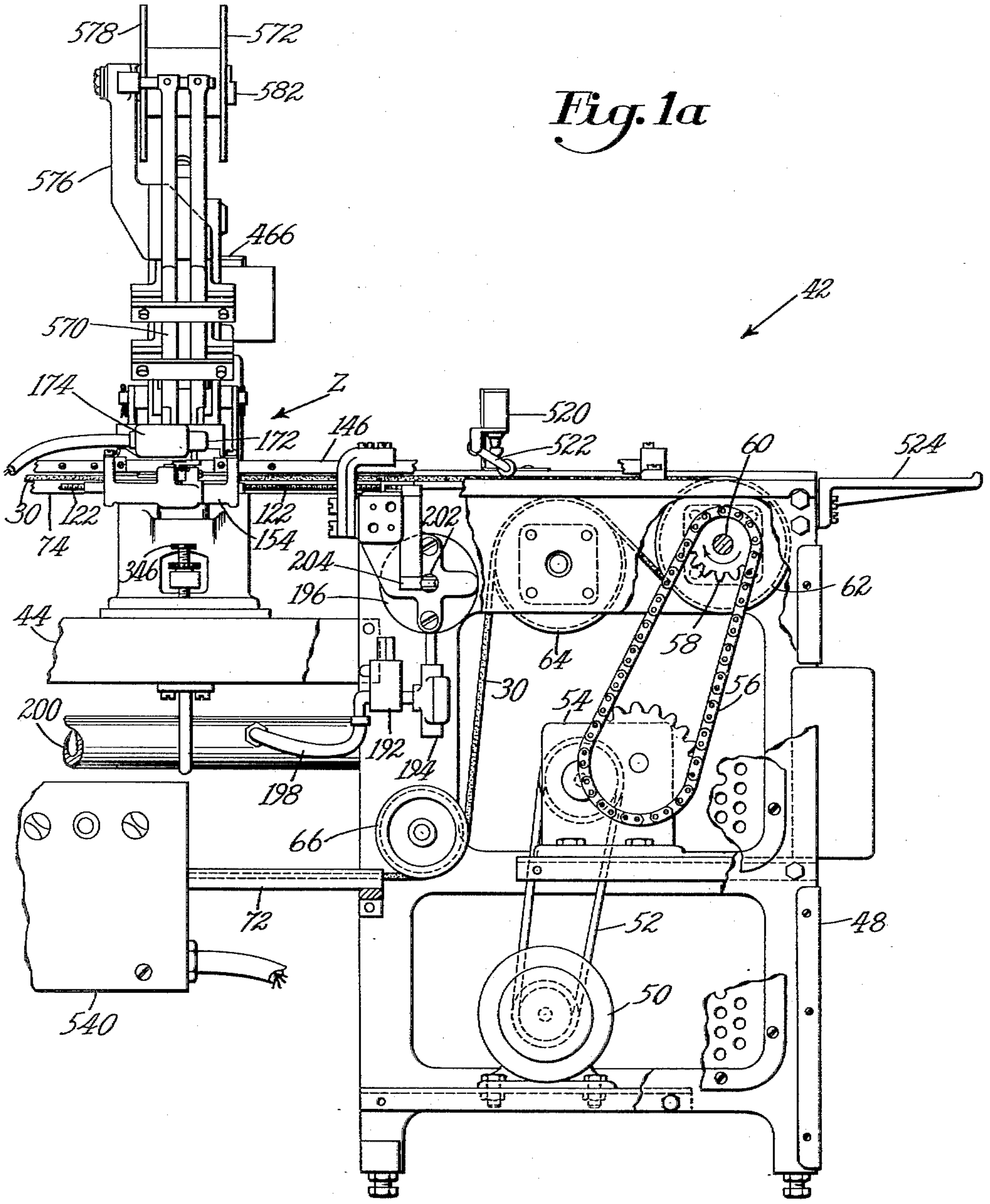

Referring first to Figs. 1 and 1*a*, the illustrative apparatus comprises a pair of endless conveyor belts 30, 30, preferably of rubber composition, for horizontally carrying from a loading station, generally designated 32 (Fig. 1), a succession of pallets 34 (Fig. 8), each of which is to be presented with a printed wiring board 36 to each one of a series of stations (designated A, B, . . . Z) including component applying machines, testing equipment, processing devices, or the like, arranged in the path of the pallets. For purposes of simplifying the description to follow, it is assumed that the devices and machines in the series of this illustrative apparatus are adapted to operate successively upon relatively stationary chassis or printed wiring boards in different ways, for instance, to apply connectors or to insert in preformed holes in the wiring boards electronic components of various types, for example, resistors, condensers or the like. A representative component inserting machine 38 will be described as occupying station A. Since the electronic components for different wiring boards may vary in number and in kind, it will be understood that the kind and number of demountable machines occupying stations spaced along the conveyor run may be varied as required to provide wiring board assemblages carrying the required number and kinds of electronic components upon their arrival at an unloading station generally designated 42 (Fig. 1*a*).

Figure 3:
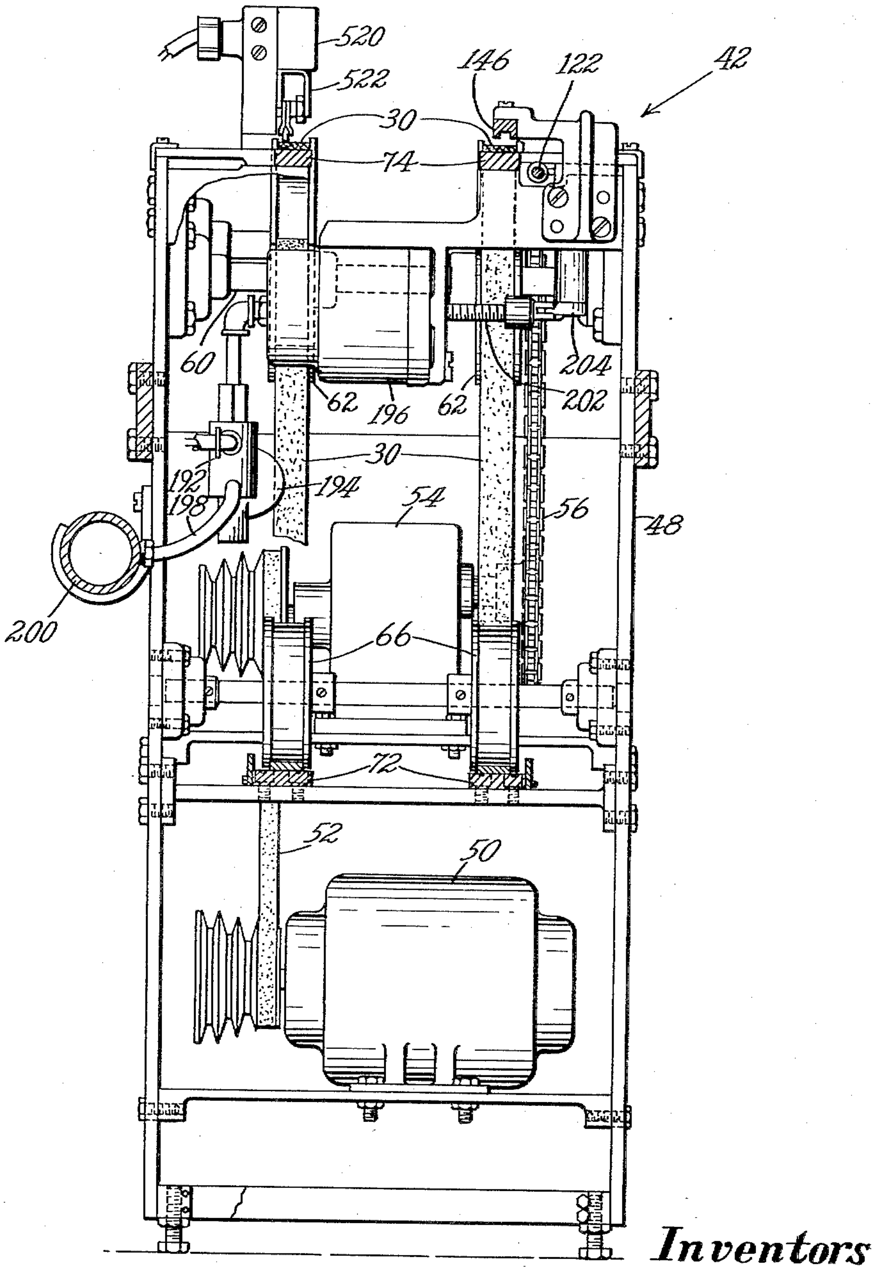
Fig. 3 is a vertical section on an enlarged scale and looking toward the right in Fig. 1*a*.

For supporting the machines and conveyor means mentioned as well as control mechanism therefor a series of rectangular frame sections 44 (one of which is shown in Fig. 2) are arranged end to end in a continuous row extending from a rectangular frame 46 (Fig. 1) supporting the loading station 32 to a rectangular frame 48 (Fig. 1*a*) supporting the unloading station 42 and conveyor drive mechanism about to be described. Each frame 44 in the illustrated apparatus accommodates two stations together with controls therefor. A motor 50 (Figs. 1*a*, 3 and 25) mounted on a lower portion of the frame 48 drives through a belt 52, a reduction gear unit 54, and a chain 56 to rotate a sprocket 58 secured on a cross shaft 60 journaled in the frame 48. A pair of pulleys 62 spaced on the shaft 60 respectively engage the right-hand extremities of the belts 30, 30, the latter thereafter running sequentially over parallel pairs of pulleys 64, 64 and 66, 66 supported by the frame 48 and pulleys 68, 68 and 70, 70 supported by the frame 46. The lower or return reach of the belts 30, 30 is guided upon spaced parallel horizontal bars 72, 72, their upper or conveying reach extending beneath the loading station 32 and being guided upon similar bars 74, 74. These bars are affixed to the different frame sections which may be individually adjusted heightwise from supporting means such as a floor.

Figure 4:
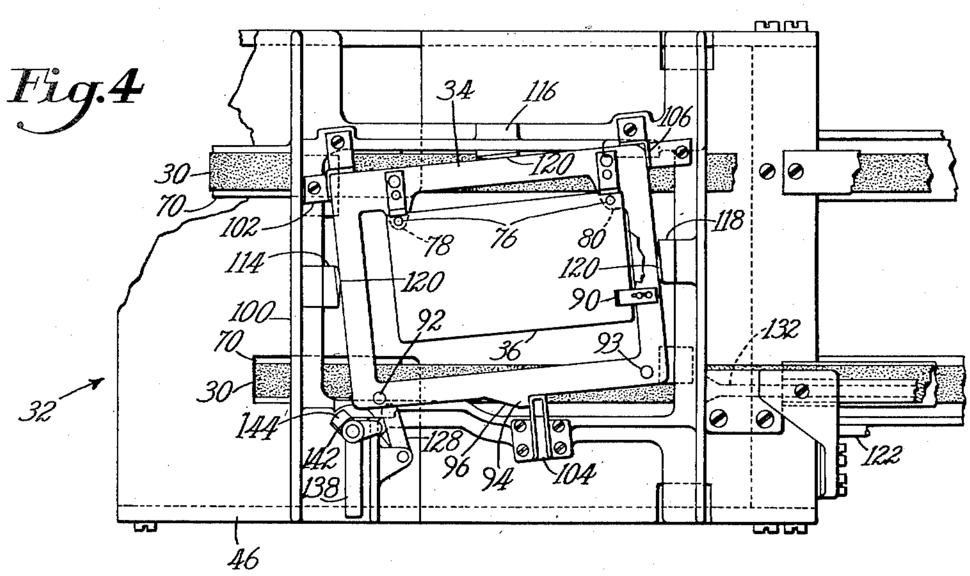
Fig. 4 is a plan view of mechanism shown in Fig. 1, stacked pallets in a hopper and release means therefor being indicated.
Figure 6:
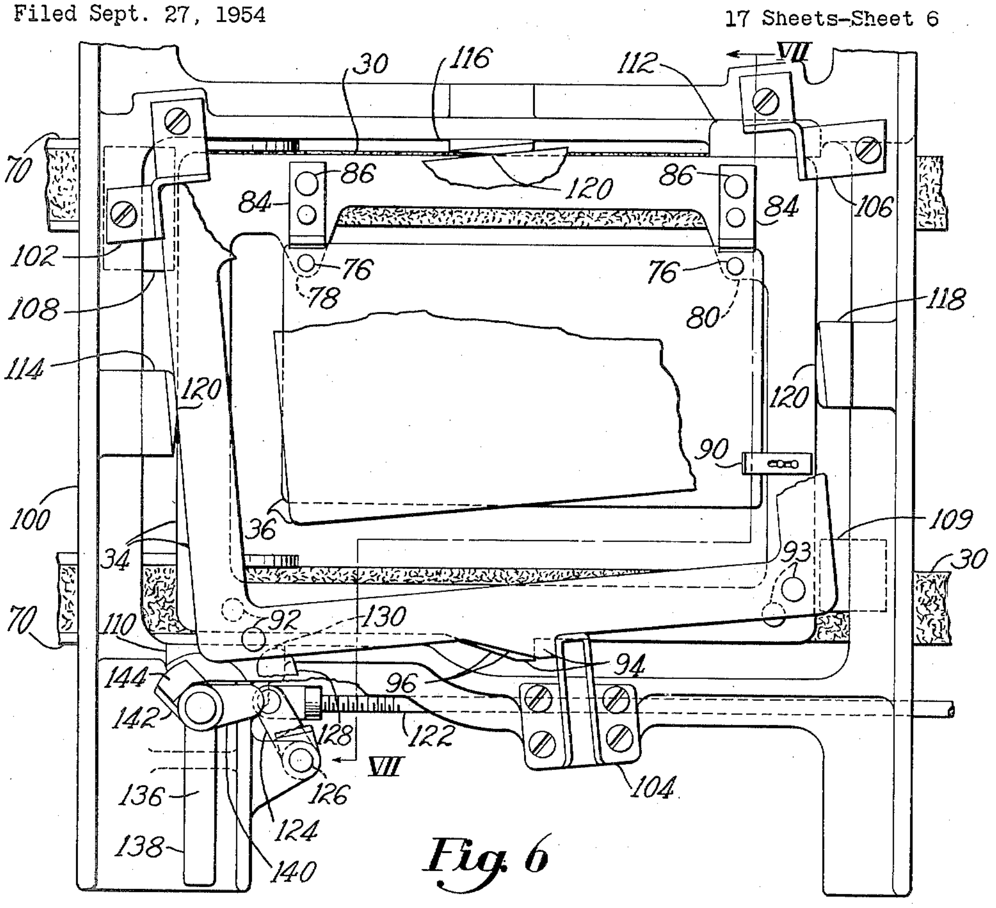
Fig. 6 is a view similar to Fig. 4 but on a larger scale and indicating the relative position of a loaded pallet after it has been released.
Figure 7:
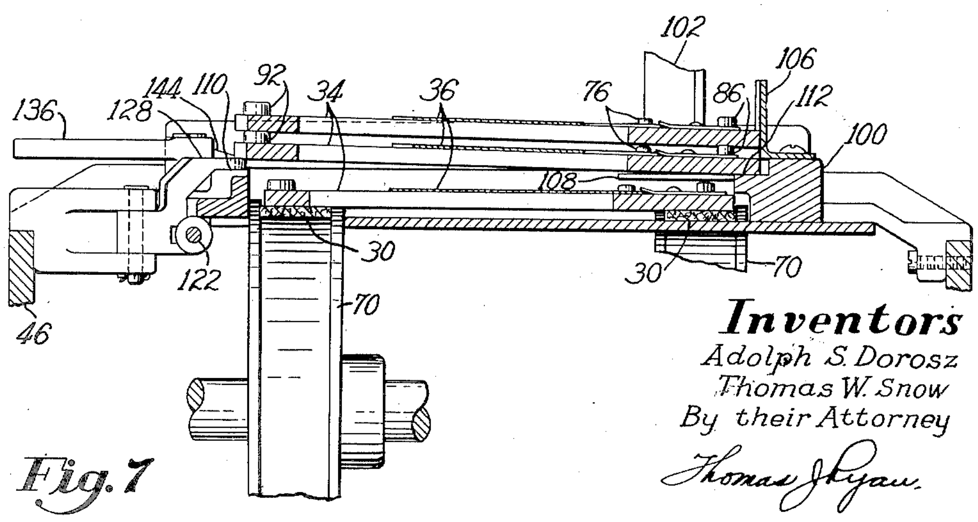
Fig. 7 is a section taken on the line VII—VII of Fig. 6.

As shown in Figs. 1, 4 and 6, the loading station 32 is designed to receive from above a stack of the pallets 34 in superimposed relation. Each of the pallets has been loaded, by manual or other means not shown, with a printed wiring board 36 on which components are to be assembled and which is provided with a pair of spaced holes for respectively receiving locating pins 76, 76 doweled in the pallets. It will be understood that the boards bear a suitably printed circuit (not shown) on at least one side thereof and that it is provided with additional preformed holes or other suitable means for receiving the components and/or treatment to be associated therewith. Each pallet is preferably of open rectangular configuration, of a light metal alloy, and adapted as by means of its internal projections 78, 80 and 82 (Fig. 8) fixedly to support a wiring board for accessibility from above and below. Spring clips 84, 84 (Fig. 8) secured by upstanding pins 86, 86 to a pallet have upturned ends 88, 88 adjacent to the pins 76, 76, respectively aiding in guiding the mounting of a board when its holes are to be registered with the pins 76, 76. It will be observed that a variety of different shapes and sizes of wiring boards may be accommodated by the pallet. A spring clip 90 having pin-and-slot connection with the pallet is arranged to be extended above a margin of the mounted board to guard against the possibility of its being loosened from the pins 76, 76. A pair of upstanding positioning pins 92, 93 is doweled and cooperates for the purpose of enabling superimposed pallets to be properly spaced apart heightwise in a hopper (Fig. 7), the pins 92, 93 also serving, as will be described, to guide the pallet between stations and accurately determine its positions thereat. The relative positions of the locating pins 92, 93 and the pins 76, 76 correspond precisely in the pallets to be used in a given production run to assure uniformity of product. Similarly, a trigger projection 94 extending from the same side edge of each pallet has a corresponding position in all of the pallets, an inclined trailing edge portion 96 serving for pallet clamping purposes, as will subsequently be described. For facilitating loading of wiring boards on pallets several snap-on type of fasteners (designated 98 in Fig. 8*a*) may be used in lieu of the spring clips 84, 84 and 90. The fastener 98 has a split end cooperative with a pin 86 and may yield bodily to permit a rounded end to register a hole in the wiring board with a locating pin 76.

Bolted on the top of the frame 46 of the loading station is an open rectangular casting 100 to which upstanding hopper guides 102, 104 and 106 are screwed. These guides are arranged respectively to accommodate external corner portions of the pallets and thus cooperate to misaline the stacked pallets slightly with respect to the direction of feed of the belts 30, 30, as shown in Figs. 4 and 6. Secured to the casting 100 are two stack supporting blocks 108, 109; two other rests 110, 112 are bosses integral with the casting 100 that are arranged respectively to support the stacked pallets by engagement with the adjacent under surfaces of the bottom misalined pallet. The casting 100 is provided with rather critically spaced tongues 114, 116 and 118 each having an end portion 120 arranged to engage substantially the mid portion of an adjacent edge of the lowest of the stacked pallets when it is still misalined by the guides as just indicated. The end portions 120 act as limiting stops and at least one of them functions as a fulcrum; they are spaced to define the relative position in which a pallet is to be deposited on the belts 30, 30.

For unstacking or releasing the pallets from the bottom, one by one, and then depositing and alining them on the belts 30, 30, a composite conveyor control rod 122 (Figs. 4, 6 and 7) extending to the unloading station 42 of the machine is provided which is actuated endwise by automatic means later to be described. Endwise movement of this rod to the right, as viewed in Fig. 6, shifts a bell-crank lever 124 connected pivotally to its left-hand end clockwise about a pivot pin 126 affixed in the casting 100. Consequent clockwise movement of an arm 128 of the lever 124 causes an extremity 130 of the arm to be swung from beneath an adjacent margin of the bottommost stacked pallet so that it may fall into horizontal position (from its inclined position shown in Fig. 7) and then be supported on the rests 110, 112 and the blocks 108, 109. Return movement of the rod 122 to the left, as viewed in Fig. 6, causes the extremity 130 to engage the side of the bottommost pallet to turn it bodily clockwise about a vertical axis, side edges of the pallet slidingly engaging the ends 120 of the tongues 114, 116, 118 until its long sides are just clear of the blocks 108, 109 and the rests 110, 112 and substantially in line with the direction of feed, whereupon the pallet is permitted to drop the short distance shown in Fig. 7 and be deposited on the belts 30, 30 for conveyance toward the first operating station of a series. For further assurance that at the outset the deposited pallets (one shown in Fig. 6) will be carried substantially in the same proper direction of feed, their pairs of pins 92, 93 pass through an inverted, straight U-shaped channel member 132 (Fig. 4) mounted on the frame 46 and having a funnel mouth for receiving the lugs.

For convenience in loading the conveyor stations with pallets by manual control when preparing the apparatus for a production run, for example, there is provided a lever 136 (Figs. 4 and 6) pivotally mounted on the casting 100. The lever 136 has an operating handle 138 for actuating it and is used at times in lieu of the control rod 122. Thus, an arm 140 of the lever may be swung counterclockwise, as viewed in Fig. 6, to pivot and slide the bottommost pallet clockwise on the tongue ends 120 and thereby release it for deposit from the blocks 108, 109 and the rests 110, 112. An arm 142 of the lever 136 has a cam surface 144 which, upon clockwise movement of the lever as viewed from above, is arranged and adapted to be inserted beneath the bottommost stacked pallet. As will subsequently be described, this action will prevent pallet release and result automatically in stopping operation of the entire apparatus.

On leaving the loading station 32 a pallet is conveyed by the belts 30, 30 to the first and succeeding stations A, B, etc. in like manner, the pins 92, 93 riding in a straight and continuously extending series of inverted U-shaped guideway channel members 146 (Figs. 2, 3) secured to the top front portions of the frame sections 44 and disposed above the front guiding bar 74. As shown herein, the devices and machines of the respective stations occupy adjustable positions on only one side of the conveyor belts, but it will be apparent that they may be positioned on either or both sides thereof, and above and/or below, if desired. When arriving at a station a pallet is disassociated from the belts 30, 30 and then precisely positioned and clamped in predetermined relation to the operating elements of that station. Since the means for accomplishing this are substantially the same at each station it will suffice in this respect now to explain only the construction at the station A having the machine 38 and to consider, with reference to Fig. 25, the electrical controls of adjacent stations A and B. Referring to Fig. 9, at each station the inner side of the member 146 is provided with two longitudinally extending spaced slots for respectively accommodating the pins 92, 93 of each pallet. The slot for receiving the lug 93 is spanned by a flat backstop plate 148 secured to the member 146. The slot for receiving the pin 92 is spanned by a pallet positioning member 150 also secured to the member 146, the member 150 being provided with a laterally projecting stop 152 which is arranged to cooperate with the pin 92, as will be described.

A bracket 154 (Figs. 1, 9, 12 and 13) is secured by screws 156 to the front of the frame section 44 and extends between the plate 148 and the stop 152 to support both the means for positioning and clamping a pallet at a station and control mechanism associated with that station. As a pallet approaches the station the trigger projection 94 engages an end of a signal lever 158 (Figs. 9, 10, 12 and 13) pivotally mounted on a pin 160 secured to a block 162 and displaces the lever 158 clockwise, as viewed from above, the member 146 being recessed to avoid interference. At the same time the pallet is forced by the signal arm transversely of the belts 30, 30. A flat vertical portion 164 of the lever 158 is arranged to engage a roll 166 carried by the end of a switch operating arm 168, the latter accordingly being swung clockwise together with a vertical stem 170 (Figs. 11 and 12) clamped thereto. This stem has bearings in a block 172 secured to a switch housing 174, a torsion spring 176 on the stem and anchored in the block being effective yieldingly to maintain engagement between the roll and the portion 164 to urge the switch operating arm 168 counterclockwise, as viewed from above. As the advancing pallet is being forced rearwardly by the lever 158, the pallet is retarded by resistance of the spring 176, belt friction, and otherwise. The pallet is disassociated from the belts 30, 30 by engaging fixed cams, its front side being raised from the front belt 30 by the projection 94 riding up and on to a flat topped cam insert 178 screwed to the bracket 154. The spring 176 is not strong enough to overcome the resistance to movement of a disassociated pallet when it comes to rest and will not act through the lever 158 to move the pallet backward. A stop 179 integral with the block 162 limits the extent of clockwise movement, as viewed from above, of the lever 158. Before proceeding into details of the automatic electrical control system of the apparatus, of which the pallet positioning-clamping means being described is but a part, it may be noted (Fig. 25) that starting the conveyor motor 50 energizes the entire control system, and conversely the latter is deenergized upon stopping the motor 50.

A commercial type of single pull, double throw, double break type of limit switch 180A (Fig. 11) is mounted in the housing 174 which, in turn, is mounted on a bracket 182 fast on the bracket 154. The clockwise movement of the signal lever 158 is effective to trip the switch 180A in one direction to close contacts 184A, 184A (Figs. 11 and 25) and thus potentially cause a signal to be given for actuation of pallet positioning and clamping mechanism by endwise movement of the conveyor control rod 122. For this purpose (as shown in Figs. 11, 9*a* and 9*b*) toggle actuated contacts of the switch 180A are tripped or shifted toward and from the contacts 184A, 184A by means of a semicircular collar 186 on the stem 170 rotating to cooperate with the yoke end of a reciprocable spring backed rod 188 operatively connected to the toggle mounted contacts. In closing the contacts 184A, 184A contacts 190A, 190A of the switch 180A are broken and will be referred to again shortly. The closed contacts 184A, 184B, etc. being connected in series (Fig. 25) they act to complete a circuit when the last of all the pallets on the belts has arrived and is being located for clamping at the respective stations, to energize a clamping control solenoid 192 governing a valve 194 (Figs. 1A and 25) associated with a conventional air motor 196 (Figs. 1A, 3 and 5) mounted on the frame 48. For reasons later explained, it should be noted that the energized solenoid 192 closes contacts 185, 187 and 189. The valve 194 is accordingly required to admit air under pressure via a hose 198 to actuate the diaphragm (not shown) of the motor 196, the hose 198 being in communication with an air supply pipe 200 supported by the frames 44 and running substantially the length of the apparatus. This pipe also supplies air under pressure to operate the machine 38, as will be explained, and one or more of the other operating stations, the pump or source of the pressure not being shown in the drawings.

Figure 5:
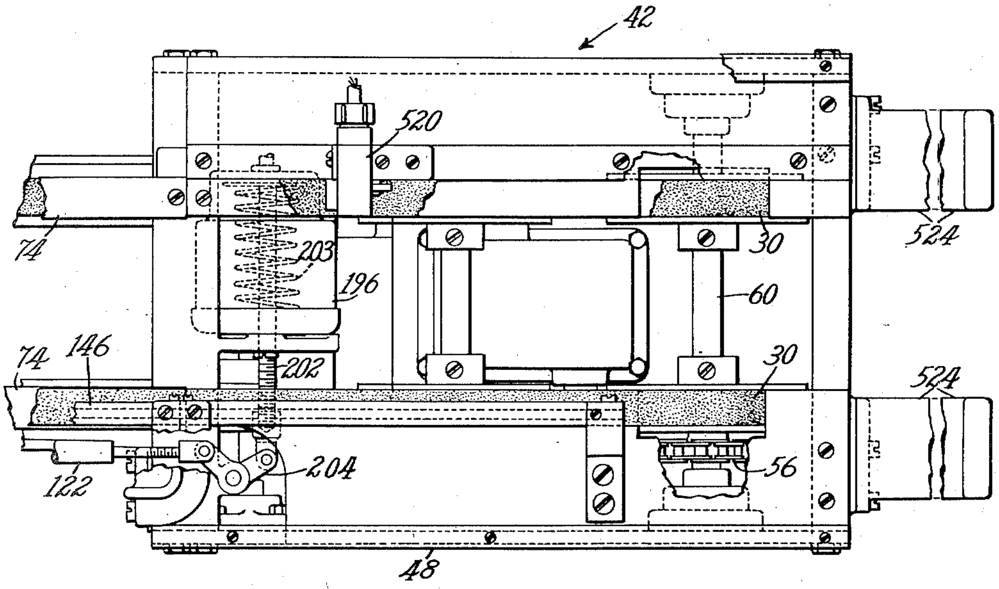
Fig. 5 is a plan view of mechanism partly shown in Fig. 1*a* for controlling release of a pallet to the conveyor.

The signal for clamping the several pallets at their respective operating stations having been given, the push rod 202 of the air motor 196 is moved by its diaphragm endwise and forwardly, as viewed in Fig. 5, against the resistance of a return spring 203. A bell-crank lever 204 pivotally supported in a bearing formed in the frame 48 has its lower arm connected to the push rod 202 and an upper arm pivotally connected to the unloading extremity of the composite conveyor control rod 122. Execution of the signal therefore results in this rod being shifted endwise to the right as seen from the front of the apparatus to cause the pallets with their wiring boards to become simultaneously locked into operating position at the several stations, the various parts at a station changing their relative positions from those shown in Fig. 9 to those shown in Fig. 10. Thus, at station A, a portion of the rod 122 flattened for clearance purposes (Figs. 9, 10 and 13) carries a pin 206 that is received in the bifurcated end of an arm 208 which is pivotally mounted at its other end on a pivot pin 210 extending vertically through alined bores formed in the bracket 154. Also pivotally mounted on the pivot pin 210 is a clamping arm 212 that is spaced above (and somewhat angularly offset from) the arm 208 by a torsion spring 214 surrounding the pin 210 and having ends respectively engaging a stud 216 fixed in the clamping arm and a portion of the arm 208. The endwise movement of the control rod 122 accordingly causes clockwise movement of the clamping arm 212, as viewed from above, to cause its rounded end 218 to engage the inclined portion 96 of the arrested pallet with a force having longitudinal and widthwise components and thereby further force the pallet bodily rearward, i. e., laterally of the direction of belt feed. Since the spring 214 is rather stiff and the stud 216 normally abuts a side of the arm 208 opposite to the engagement of that arm with an end of the spring, the clamping arm 212 is in effect directly connected to the control rod 122 when moved into pallet clamping position but is permitted to yield counterclockwise (as viewed from above) during endwise overtravel of the rod as a take-up or self-adjusting means whereby the clamping arm 212 of each station may be effectively actuated. The pallet is accordingly urged obliquely rearward until its advance locating lug 93 abuts the backstop plate 148 and the locating lug 92 abuts both the longitudinal stop 152 and the member 150, as shown in Fig. 10. While the pallet is thus being brought to a predetermined clamped or rest position with the projection 94 on the cam insert 178, the opposite or reaward side of the pallet is raised to be disassociated from the rear belt by being thrust against a longitudinally extending beveled back rail 220 (Figs. 9 and 12) affixed to the rear guide bar 74. Preferably the timing is such that a pallet is completely off the belts before clamping occurs. For a purpose later explained, in being elevated on its rearward side from adjacent belt 30 the rear side of the pallet engages and displaces a dampening detent 222 pivotally supported by a U-shaped bracket 224 screwed to the rear bar 74. A torsion spring 226 is arranged to act on the detent to bias it against rearward displacement by the pallet and is suitably preloaded. By means of a setscrew 228 adjustably threaded through the detent for normal endwise engagement with the bar 74, the initial positions of the pallet engaging surface of the detent is determined. The relative position of the detent along the rail 220 is preferably arranged so that the pallet being positioned will be swung clockwise, as viewed from above, to move the pin 92 first against the stop 150, the longitudinal component of force thereafter applied by the clamping arm 212 sliding the pin 92 against the stop 152.

To clear the signal lever 158 heightwise from the pallet trigger projection 94 for return or counterclockwise movement, as viewed from above, under the influence of the now loaded spring 176, and in order thus to actuate the machine 38 automatically at station A for operation upon the wiring board in the clamped pallet, the block 162 supporting the lever 158 is threaded on a bolt 230 which pivotally extends through a horizontal bore in the bracket 154 (Figs. 12 and 13). During pallet clamping clockwise movement of the arm 208, therefore, a cam surface 232 (Fig. 13) on that arm is arranged to engage a cam surface 234 on the block 162 to pivot it upwardly with the lever 158 about the bolt 230 as a turning axis. Such upward movement is yieldingly restrained by a tension spring 236 (Figs. 11 and 13) connecting the block with the bracket 154, and downward movement of the block 162 and the lever 158 is limited by a pin 238 affixed in the block and arranged normally to abut a stop shoulder 240 formed on the bracket 154. For limiting the extent of counterclockwise movement of the signal lever 158, its front end is disposed to engage a raised stop portion of the bracket 154. Being raised clear of the clamping arm 212 and the pallet, as indicated in Fig. 12, the signal lever 158 in its counterclockwise movement shifts the toggle contacts of the limit switch 180A to open the contacts 184A, 184A and close the contacts 190A, 190A. As a consequence, through a machine driver return contact 244 (Fig. 25), hereinafter further referred to, a solenoid valve 246 (Figs. 2, 14 and 25) is actuated and thus admits via hose 248 a supply of air under pressure to operate an air motor 250 of the machine 38, this machine being adapted to insert electronic components of the double end "pigtail" type such as one-half watt resistors R (Figs. 8 and 25). In like manner, for example, arrival and clamping of a pallet at station B is prerequisite to initiating an operation such as insertion of a component in a printed wiring board at that station. From the foregoing it will be clear that substantially simultaneous clamping of the several pallets at their respective operating stations by the several arms 212 (the arm 212 at station A only being shown) is automatically followed by substantially simultaneous commencement of the cycles of the various operating instrumentalities of those stations. In other words, the above-mentioned "overtravel" endwise of the control rod 122 assures effective pallet clamping to occur at each station and then functions as an automatic timing means by which the operating stations are thereafter signaled to be actuated simultaneously.

In the course of the automatic operation of the illustrative apparatus, the machine 38 and the devices or machines of the other stations of the assembly line respectively operate on the appropriate predetermined portions of each printed wiring board. In order to locate the resistor inserting instrumentalities of the machine 38 (Figs. 2, 14 and 19) in accurate register with the appropriate pair of preformed holes in the wiring board mounted in the pallet clamped at station A, and in order to assure convenient flexibility when altering the apparatus for operation on different wiring board circuity, a hollow C-frame 260 of the machine 38 is arranged to be clamped in different positions about an opening 262 in a horizontal plate 264 secured to the frame section 44. For this purpose a clamping bolt 266 (Fig. 14) extends upwardly through a crossbar 268 spanning the opening 262 and has its upper end threaded into an anvil housing 270. The latter is bored to receive a pair of rods 272, 272 which respectively extend into opposite sides of the C-frame. Accordingly, a single handle 274 connected at one end to the head of the bolt 266 may be used to turn it when adjusting the machine to establish an operating position angular with respect to a vertical axis, and widthwise and/or lengthwise of a wiring board.

The C-frame 260 has an overhanging end portion which is split to provide a clamp type of cylindrical bearing for receiving a sleeve 280 which supports a component applying head generally designated 282. Confronting cheeks 284, 284 of the frame are provided with alined bores having threads of opposite hand, and a bolt 286 threaded into these bores is operated by a hand lever 288 to enable the component applying head 282 to be independently adjustable about a vertical axis. Upon actuation of the air motor 250, as above mentioned, its diaphragm is caused to force its push rod 290 (Fig. 14) upward against the resistance of a return spring 292 in order to effect cooperation between a vertically reciprocable anvil, generally designated 294, slidable in the bracket 270 and inserting instrumentalities of the head 282, which will later be described. Operative connections between this head and the push rod 290 comprise an upright extension link 296 for threadedly receiving at its lower end the upper end of the rod, a lever 298 pivotally mounted on a fulcrum pin 300 journaled in the frame 260 and having its rear end pivotally secured to the upper end of the link 296, a lever 302 also pivotally mounted on the fulcrum pin 300 and a ball ended link 304 pivotally suspended from the front end of the lever 302. For actuating the anvil 294 the link 296 carries a rod 306 which extends transversely through slots 308, 308 formed in opposite sides of the frame 260. Depending from opposite ends of the rod 306 is a pair of parallel links 310, 310 (one only shown), the lower ends of which respectively have a pin 312 that is received in a slot 314 in each of a pair of rearwardly extending arms 316 of a bell-crank lever 318. The latter is pivoted on the C-frame at 320 and has a forwardly extending arm carrying a pin 322 arranged to be received in slots formed in corresponding ends of parallel toggle operating bars 324 (one only shown) which are spaced by rolls 326, 326. A tension spring 328 connecting a roll 326 and the anvil bracket 270 assists in assuring that anvil actuating toggle links 330, 332, which have their knee joint connected to the front ends of the bars 324, will normally return to their initial broken condition, as shown in Fig. 14.

In order to assure that the toggle links 330, 332 straighten during the initial portion of the upward movement of the push rod 290 so that the upper end of the anvil will be in engagement with the under side of the printed wiring board in readiness to support it during inserting operations of the head 282, a rather stiff wire torsion spring 334 is mounted on a pin 336 in one of the arms 316, the ends of this spring respectively bearing against a pin 338 extending from the inside of that arm 316 and against one of the pins 312. The arrangement accordingly is such that after considerable toggle straightening to raise the anvil in the first part of a machine cycle substantially to work engaging level, the spring 334 finally yields as the pins 312 are moved to the upper ends of their slots 314. The anvil is also maintained in work engaging position until that time in the down stroke of the push rod 290, subsequent to the pins 312 again engaging the lower ends of the slots 314, when the pin 322 has been shifted to the left-hand end, as viewed in Fig. 14, of its slots in the bars 324. The anvil is limited in its downward travel by a stop 340 integral with the toggle link 330, a side of this stop engaging the bottom of the anvil, as shown in Fig. 14. A side 342 of this stop is arranged to prevent travel of the toggle beyond straightened condition by its engagement with a different portion of the bottom of the anvil.

In order to anticipate and provide for various adjustments which may be needed under different operating conditions, the machine 38 is provided with several mechanisms that normally need not be readjusted until a new production run is to be made. The anvil 294, for example, may have the upper limit of its work engaging stroke modified to accommodate manufacturing variations, bowing of wiring boards, different thicknesses of wiring boards, or different components to be acted on, or for other reasons. For this purpose there is pivotally mounted on the front rod 272 a lever 344 (Fig. 14) which pivotally supports the lower end of the toggle link 332 and extends forwardly threadedly to receive a knurled adjusting screw 346 that abuts the frame 260 endwise. Another mechanical adjustment commonly found useful in setting up the machine 38 is the provision of means for changing the depth of drive of the head 282. Thus the lever 298 and the lever 302 are made to function as a single composite lever capable of imparting a substantially constant stroke having variable limits to a vertical driver bar 350 (Figs. 15, 16 and 21) depending from the ball end of the link 304, the lever 298 being coupled to the lever 302 by a thumbscrew 352 rotatable in the latter and in an adjustable angular relation as determined by a thumbscrew 354 threaded through the lever 302 for endwise engagement with the lever 298. For assuring that the lower or inserting end of the driver bar 350 (Fig. 19) may, at the bottom of its stroke, have appropriate heightwise relation to the wiring board, a further initial adjustment is normally made prior to actually setting the thumbscrews 352, 354, namely, threading the link 296 on to the push rod 290 to just the extent required to enable the upper end of vertical slots 356 (Fig. 14) effectively to determine the limit of upward movement of the transverse rod 306 within the displacement range of the motor 250. To this end the slots 356 are formed in a pair of vertical links 358, respectively, which are trunnioned on pins 360 extending into a block 362 secured to the C-frame.

The machine head 282 herein shown (Figs. 15 and 16) has its driver bar 350 secured to the ball ended link 304 by means of screws 370 extending through a clamping plate 372 and into the bar, the ball end being nested in matching spherical recesses formed in the bar and in the plate 372. As will next be described, it is a single down stroke of the driver bar which is relied upon for actuating means for cutting and forming the leads L of each of the successive resistors R, or the like, which are to be inserted. In contrast to the earlier disclosed construction above mentioned, the driver bar 350 is arranged for independently actuating the cutting and forming instrumentalities now provided. A three-sided rectangular casing 374 having internal surfaces for guiding the bar is provided with a front cover plate 376 and is adjustably affixed heightwise, for a reason later stated, by means of set screws 378 to a flat lower portion of the sleeve 280. As perhaps best shown in Fig. 21, the bar 350 is doweled and provided with an oppositely projecting front pick-up pin 382 and a similar rear pick-up pin 384. Ends of the pin 382 are arranged to cooperate with a pair of dowel pins 386, 388 affixed in a flat front member 390, and ends of the pin 384 are arranged to cooperate with a pair of dowel pins 392, 394 in a flat rear member 396. The members 390, 396 correspond substantially in shape and function and are respectively positioned heightwise initially in a machine cycle by the return or up-stroke of the driver bar pins 382, 384 acting to engage the dowel pins to lift the members, as indicated in Figs. 15 and 16. The member 390 has a mortise 398 for receiving tenon portions 400 of a pair of outside formers 402, 402, and in like manner the member 396 has a mortise 404 for receiving tenon portions 406 of a pair of cutters 408, 408. It accordingly will be understood that the formers 402 and cutters 408 may be removed to perform, upon occasion, the substitution of modified formers and cutters. Each of the formers 402 has a vertical V-shaped guide groove 410 for accommodating a lead L after it has been cut to appropriate length by a shear blade 412 of the adjacent cutter 408. Also, for a purpose soon to be described, each of the members 390, 396 is bored to receive a hardened bushing 414 which accommodates a portion (greater than half) of a ball detent 416. As shown in Fig. 16, when the machine is at rest the front detent 416 is more than half seated in the front bushing 414 and partly nested in a matching spherical cavity 418 in the front of the driver bar. The rear detent 416 in like manner is more than half seated in the rear bushing 414 and only partly nested in a rear drive bar cavity 420.

During the initial portion of the down-stroke of the driver bar, i. e., in shifting from the position shown in Fig. 16 to nearly that shown in Fig. 17, the members 390, 396 are caused to travel downwardly simultaneously until the latter engages a stop shoulder 422 of the casing 374, the rear ball detent 416 having just been caused by the descending driver bar cavity 420 to be cammed rearwardly into a spherical cavity 424 which, together with the rear bushing 414, is adjusted large enough to seat the ball detent, as shown in Fig. 17. The down-stroke of the driver bar is accordingly not impeded. The arrangement is such that when the cutters 408 have thus been arrested their blades 412 have respectively cooperated with a pair of spaced shear blocks 426, 426 (Figs. 18, 20) secured to the bottom of the casing 374 to cut off the oppositely extending leads L at appropriate distances from the body of a resistor R which has been fed on to the shear blocks by positively acting means hereinafter to be described.

The descending driver bar 350 continues to carry the member 390 and its outside formers 402 downwardly until, as shown in Fig. 19, the member engages a flat spacer block 430 secured to the front cover plate 376, the block 430 also serving to guide the bar 350. Just an instant prior to this engagement, in order to clear the driver bar for its continuous operating down stroke, the front detent 416 has been caused by the cavity 418 to be forwardly cammed into a spherical cavity 432 in the cover plate. The heightwise adjustability of the block 430 permitted by the set screws 378 allows the lower limit of travel of the outside formers 402 to be changed according to the dictates of a particular component or wiring board. The cavity 432, together with the front bushing 414, is just large enough to seat the front ball detent, as shown in Fig. 19, and the driver bar 350 is accordingly thereafter free to advance along a very short distance to thrust the then formed leads L endwise respectively through the preformed holes in the positioned wiring board and against clinching terminals 434, 436 (Figs. 15 and 20) of the anvil 294. To avoid affecting electrical characteristics of a component, formation of the leads is effected without disturbing the body of the component, the outside formers 402 acting in cooperation with an inside former 438 much in the manner disclosed in the application above referred to, the inside former being pivotally mounted on a horizontal pin 440 (Fig. 15) affixed in the lower portions of the sides of the casing. As viewed in Fig. 16, when the machine is in rest condition the lower U-shaped end 442 of the inside former is arranged to support the leads L of a resistor next to be formed for insertion, without contacting the resistor body, a flat upper end of the inside former then being positioned by engagement with a flat portion 444 on the back of the driver bar. During lead formation the driver bar and formers change relative positions from those shown in Figs. 15 and 16 to those shown in Figs. 17 and 18, concurrent ascent of the anvil also being indicated. For maintaining the upper end of the inside former in cooperative relation with the portion 444 and with an arcuate cam surface 446 (which, if desired, may simply be a corner portion) formed in the back of the driver bar, a leaf spring 448 is provided which is affixed at one end to a block 450 screwed to the back of the casing 374. As will be apparent from a comparison of the progressive views of Figs. 17 and 19, counterclockwise movement of the inside former is effected by the down stroke of the driver bar 350, after being initiated by the spring 448, to clear the path of the lower and recessed end of the bar so that its notches 452, 452 (Figs. 13 and 20) may bear downwardly on the lead shoulders adjacent to the resistor body.

In installing many different articles and components by clinching their projecting wire ends toward or apart from each other at one side of a chassis receiving them, it is satisfactory to use an ordinary solid metal clinching anvil. However, when assembling electrical equipment, especially electronic apparatus, it is highly important to know that a component has without fail been inserted and clinched as required. The unique "split" type of anvil herein disclosed and having the electrically isolated clinching terminals 434, 436 serves to assure that a resistor or the like will be inserted and clinched as required or the machine 38 (and therefore the entire apparatus) will automatically cease to operate. As shown in Fig. 20, these conducting anvil terminals are separately mounted in a non-conducting plastic, preferably translucent, mold 454 which has a circular groove 456 in its base for receiving an end of a set screw 458 threaded in a bore formed in the upper end of a hollow cylinder 459. The latter is reciprocably mounted in the bracket 270 and has pivotal connection with the upper end of the toggle link 330. In order to have access to limited space which may be available immediately beneath the wiring board, the mold 454 and its terminals 434, 436 are narrow in configuration. If the head 282 is adjusted about a vertical axis the anvil terminals should also be adjusted accordingly and then locked by resetting the set screw 458. Without risk of modification to the electrical characteristics of the resistor R or other component, its leads when properly cut, formed and clinched are caused to be thrust endwise by the driver bar through the wiring board to contact the anvil terminals 434, 436 respectively to complete a circuit through the driver bar 350, the contacts 190A then being closed. A solenoid 460 (Fig. 25) is thereby energized and opens the contact 244 and a contact 462 (Fig. 25) to deenergize the solenoid valve 246 and permit the return upward stroke of the driver bar under the influence of the spring 292. Since an undesirable premature return stroke of the driver bar might be effected prior to clinching and immediately upon initial contact of unclinched lead ends with the terminals 434, 436, a time delay means is introduced into the anvil circuit to assure complete clinching. For this purpose, as herein shown, a conventional time delay switch 464 (Fig. 25) is provided to delay the return down stroke of the extension link 296. An arm 466 secured to the latter normally engages the upper end of a piston rod 468 (Fig. 25) carrying a contact 476, a compression spring 470 urging the piston upwardly in a cylinder formed in the switch housing. The arrangement is such that the arm 466 rises faster than the piston rod 468 during the inserting stroke of the driver bar 350, the piston rising at an adjustable rate determined by the inflow of air into the switch housing as controlled by a needle valve 478. By reason of the contact 476 holding open the anvil circuit, even though the lead ends are contacting the terminals 434, 436, clinching is completed before the contact is caused by the arm 466 to be lowered to close the anvil circuit and effect return of the driver bar as described. During the return stroke the solenoid 460 is maintained energized by a relay 480 (Fig. 25) which closed, as did a relay 482 hereinafter referred to, when the solenoid 460 was energized. Should the machine 38 fail to insert a resistor R, the driver bar 350 would remain in its lowered position and a pilot light 484 would continue to glow.

When the driver bar 350 has been retracted to normal starting position, the pallet 34 is released automatically from its clamped position and, conversely, if any single driver bar or corresponding inserting tool or treating instrumentality at another of the stations of the assembly line fails to return to its retracted position at the close of a cycle, all of the pallets will remain clamped in their stations. Thus, at station A, a pallet unclamping initiating switch 490 (Figs. 14 and 25) is closed upon retraction of the bar 350, being actuated by a roll 492 mounted for cooperation with a cam 494 formed on the link 296. At the end of a work cycle of machine 38 its electrical hook-up accordingly signals for the unclamping of its pallet through the series including the closed switch 490, the closed relay 482, and a machine driver bar return switch 496, the latter being included to enable the driver bar (upon occasion) to be retracted without releasing the clamped pallet. Simultaneously, and in like manner, completion of the work cycle at station B finds contacts 500, 502 and 504 closed (contacts 506 and 508 having been opened by the energizing of a solenoid 510 corresponding to the solenoid 460). Through the series of closed contacts mentioned a solenoid 512 (Fig. 25) is energized to open a contact 514 thereby deenergizing the clamping control solenoid 192. The latter becomes deenergized since the contacts 462 and 506 had been previously opened by the energization of the solenoids 460 and 510. With the solenoid 192 deenergized, the contacts 185, 187 and 189 open to cause the valve 194 to act to unclamp the pallets from their respective stations, the loaded return spring 203 (Fig. 5) thus being permitted to shift the composite control rod 122 endwise (to the left as viewed from the front of the machine). As above explained, such return endwise movement of the rod 122 results in a new pallet and and wiring board being deposited on the belts 30 for assembly as a completed pallet is being discharged from the final machine in the line to the unloading station and all other pallets on the belts are free to be conveyed to the next station. Upon being unclamped by the resultant return movement counterclockwise, as viewed from above, of the clamping arm 212, the loaded torsion spring 226 forces the pallet widthwise toward the front so that its rear side again contacts the rear belt 30 and by its traction the projection 94 is advanced downward off the cam insert 178. The pallet accordingly is again conveyed by both belts 30 to the next station.

At the unloading station a rate control and safety switch 520 (Figs. 1*a*, 3, 5 and 25) is mounted on the frame 48 and arranged to be actuated by a pivotally supported roll carrying lever 522, the roll normally being spaced above the level of the belts 30, 30 by less than the thickness of a pallet. As herein shown, this roll is disposed from the right-hand extremity of pallet stop brackets 524, 524, as viewed in Figs. 1*a* and 5, attached to the frame 48 a distance equivalent to two and a fraction times the length of a pallet, thus insuring that, if the unloading station is not being relieved of finished assemblages, the third completed pallet will trip and disconnect the switch 520 by displacing the lever 522 upward and thereby prevent the apparatus from continuing to operate further, the unclamping initiating switches 490, 502, etc., not now acting to signal for release and feeding of the pallets. It will be obvious that the switch actuating lever 522 may by its suitable location be arranged automatically to cease operation of the apparatus when any predetermined number of pallets has accumulated at the unloading station. The output of the system may accordingly be controlled merely by the rate at which finished pallets, i. e., wiring boards, are removed.

Controls for the apparatus as a whole are operative from a loading station control box 530 (Fig. 1) and include a starting switch 532 for controlling the motor 50 and making power available to the control circuit, a stop switch 534, a clamping switch 536, and an unclamping switch 538. A box 540 on each frame section 44 houses controls for a pair of adjacent machines. Optional elimination of a machine without affecting operation of other machines or devices of the assembly line provides greater flexibility in use of the equipment and minimizes "downtime" in adjusting for simple changes in assemblages.

Accordingly, a three-pole cut-out switch on the box 540 has contacts 542, 544 and 546 (Fig. 25) and is provided to enable the machine 38 to be "by-passed" or in effect eliminated from the normal operation of the apparatus, though successive pallets continue to be clamped at station A in the usual way. Similarly, a three-pole switch having contacts 548, 550 and 552 is provided to enable an adjacent machine (diagrammatically indicated in Fig. 25) to be cut out from normal operation of the apparatus. Assuming, for example, that the machine 38 is to be "cut out," upon shifting contacts 542, 544 and 546 from their positions shown in Fig. 25, successive pallets will continue to be clamped and unclamped as usual at station A but its driver bar 350 will not be actuated. As above noted, lead clinching caused by the driver bar 350 and actuation of the switch 490 normally had been relied upon to effect pallet unclamping and this result is now accomplished through shifting the cut-out switch to break two circiuts and make one other in order to deenergize the clamping solenoid 192 for the purpose of reopening the contact 187 and hence deenergize the valve 194 and effect unclamping. Thus, referring to Fig. 25, the circuit from the closed contact 185 through the contacts 542 and 462 and to the solenoid 192 is broken by opening the contact 542; the circuit from the closed contact 185 through the contacts 550 and 506 and to the solenoid 192 is broken by the solenoid 510 associated with station B becoming energized in the usual way (upon proper insertion of component leads at station B) to open the contact 506; and lastly the circuit from the closed contact 185 through the closed contact 514 and to the solenoid 192 is broken by causing the contact 514 to be opened by the energization of the solenoid 512, this energization following as a consequence of the solenoid 510 being energized through a circuit extending from the unloading safety switch 520 through the now closed contacts 546, 500, 504, 502. Upon the reopening of the contact 189 the solenoids 460 and 510 are deenergized and the machine control circuit is automatically reset so that the described cycle can be repeated.

As shown in Fig. 25, the machine driver bar return switches 496, 504 are in their normal positions for automatic operation of the apparatus, their open contacts being closed and their closed contacts being opened in the event a driver bar is desired to be retracted without effecting pallet unclamping.

Upon occasion, such as when initially setting up the apparatus for production of a new assemblage, a normally open switch 560 (Figs. 1 and 25) is used. When closed it energizes the valve 194 to effect pallet clamping at all stations simultaneously by means above described and, when open, it unclamps all of the pallets. Assuming that setting up adjustments have been appropriately completed at each station, for example, that the preformed holes in a clamped printed wiring board are in register with the cut and formed leads to be thrust endwise therein at a station, a brief manual routine, now to be described, is followed in loading the assembly line as a prerequisite to automatic operation of the system. With all switches in their inoperative positions and the loading station having a supply of pallets loaded with wiring boards, the conveyor belts 30, 30 are set in motion upon closing of the switch 542 and a pallet is fed to the first station in the line after being deposited on the belts through the manual use of the handle 138, as above explained. The three-pole switch 542, 544, 546 is actuated so that station A will not be "cut out" and that the clamping switch 546 is closed to energize the solenoid 192 which closes the contact 187 and actuates the valve 194 to effect pallet clamping. During clamping, the solenoid 192 is maintained energized through the unclamping switch 538, the contact 514, and the contacts 462 and 506. After pallet clamping at station A the machine 38 will automatically complete its operating cycle. Those stations not yet receiving pallets will remain at rest. To unclamp the pallet and release it for conveyance to the next station, the switch 538 is open to deenergize the solenoid 192 and to maintain the contact 187 which deenergizes the valve 194. Replaced operation of these controls for the several stations until they all have received a pallet and operated on a wiring board (so that one board has been completed) places the system in condition for fully automatic operation, the bottom pallet in the loading hopper thereafter being automatically released to the belts 30, 30 each time a completed wiring board assemblage is discharged to the unloading station.

Operation of an inserting head of the type described results in manipulation of the end portions of leads without disturbance to the bodies of the components. The machine 38 is accordingly preferably provided with means whereby a supply of resistors R or the like can be fed in a row in regularly spaced side-by-side relation to the head 282 for automatic insertion. One convenient arrangement for assuring such systematic supplying of components one by one is the belted bundling disclosed in a pending application, Serial No. 428,927, filed May 11, 1954, in the names of Joseph Harrington, Jr. and Donald E. Houser. According to this arrangement, as indicated herein, each component has the opposite ends of its flexible leads suspended from a strip of folded tape T. (Figs. 17, 19 and 20), the body of a component and adjacent lead portions being fully accessible to forming and cutting tools, for example, and individual components being arranged in substantially parallel relation. Regardless of the particular component package or supplying means used, it is essential to accurate and reliable lead formation and insertion that leads of successive components come on to the shear blocks 426, 426 so that the cut lead portions to be formed will be received in the grooves 410 and the lead shoulders will be accommodated in the notches 452. Better to assure that successive leads may thus be acted on by the instrumentalities of the head 282, a pair of feed wheels 562, 564 (Figs. 15, 22) is provided, the wheels, respectively, having the same number of evenly spaced V-shaped grooves 566. The wheels are rotatably mounted on a shaft 568 journaled in opposite lower sides of the casing 374, and adjacent grooves of each wheel are peripherally spaced to receive the lead ends of successive, adjacent components. Since the wheels are maintained in phase during rotation by means to be explained, the inclined sides of a pair of grooves 566 corresponding in phase serve to straighten, if need be, the opposite leads of a component before positively feeding them to a position in register with the head operating instrumentalities. As shown herein (Fig. 17), it is the bottommost pair of grooves 566 which accurately aline oppositely extending leads of successive components with these instrumentalities, a number of adjacent grooves cooperating with a like number of succeeding or trailing leads progressively to advance the row of components being supplied. In this way any unwanted bending of the oncoming flexible leads is avoided during feeding through a raceway 570 (Figs. 2, 14) affixed to the front of the shear blocks 426. Unwinding of a supply reel 572 (Figs. 14 and 23) on which the belted components are wound is thereby effected without difficulty though restraining means is employed to prevent overfeeding which might otherwise occur with a flexible component package. The reel 572 is rotatably supported on a tubular sleeve 574 (Fig. 23) that is mounted in a bore formed in the upper end of a bracket 576 affixed both to the cover plate 376 and the raceway 570. For adjustably restraining overtravel of the reel while supplying components to the machine 38, a brake is afforded by means of a reel side 578 having frictional engagement with the bracket 576 as effected by a tension spring 580 within the sleeve (Fig. 23). One end of this spring is connected to a reel releasing key 582 and the other end is connected to an end of a set screw 584 threaded through a plate 586. A nut 588 on the set screw serves to lock it in adjusted position. The releasing key 582 also provides braking by its frictional engagement with the reel when in the relative position shown in Fig. 23. Fig. 24 indicates how the key may be partially inserted endwise in the sleeve 574 to permit easy demounting of an empty reel and replacement with a full one without changing the degree of overtravel restraint.

For automatically unwinding the reel 572 and successively positioning the components to be formed and inserted, the feed wheels 562, 564 are rotated step by step counterclockwise, as viewed in Fig. 16, by driver bar controlled mechanism now to be explained. A bell-crank lever 590 (Figs. 16, 17, 19 and 22) is pivotally mounted on a pin 592 journaled in the block 450. Spaced arms 594, 594 of the lever 590 respectively carry pivotal pawls 596, 596. Corresponding ends of the pawls are arranged respectively to cooperate with grooves 566 then in phase. Tension springs 598, 598 connected between each pawl and an arm of the lever 590 urge the pawls into operative relation with the grooves 566, the lever 590 being yieldingly urged counterclockwise, as viewed in Fig. 16, by a tension spring 600 having its upper end affixed to a tab on the sleeve 280. The arrangement is such that no feeding occurs during the down stroke of the driver bar 350 but only during its up stroke, i. e., in returning from its position shown in Fig. 19 to that shown in Fig. 16. For this purpose an end of an arm 602 of the lever 590 is arranged to be engaged by the lower portion of the cam surface 446 to move the lever 590 clockwise, as viewed in Fig. 16. The consequent raising of the pawls 596, 596 is more than sufficient to rotate the wheels 562, 564 counterclockwise, as seen in Fig. 16, to advance the leads of the next resistor to be formed for insertion into exact register with the grooves 410. Spring backed detents 604, 604 (Fig. 15) recessed in the casing 374 are thereby dislodged endwise respectively from one pair of corresponding bottommost grooves 566 and reseated in a succeeding pair of corresponding bottommost grooves 566, further travel of the driver bar toward the end of its upstroke thereafter merely resulting in lost counterclockwise (as viewed in Fig. 16) pivotal movement of the pawls. For adjustably determining the upper limit of the driver bar on its retraction, a rod 606 (Fig. 14) depending from the front end of the lever 298 threadedly supports a stop nut 608 engageable with the frame 260 and a lock nut 610. During the down stroke of the driver bar the spring 600 is permitted to move the lever 590 counterclockwise so that the pawls may engage another pair of grooves 566 preparatory to further component feeding. It will be understood that the engagements of the pick-up pin 382 with the dowel pins 386, 388 and of the pick-up pin 384 with the dowel pins 392, 394 during the up stroke of the driver bar will return all operating parts of the machine head to their initial positions in readiness for the next component to be inserted.

From the above description it will be recognized that this invention affords a method of assembly and automatic assembling apparatus versatile in nature and capable of high output, the assemblages produced being consistently uniform and of reliable quality.

Having thus described our invention, what we claim as new and desire to secure by Letters Patent of the United States is:

1. Apparatus for assembling components on work pieces comprising a series of machines respectively having tools operative to apply components successively, means for simultaneously feeding a plurality of the work pieces singly from one machine to the next in the series, and positioning and clamping means associated with each machine for disassociating successive work pieces from said feeding means and holding them in fixed relation to the operating paths of said tools.

2. Apparatus for assembling components in desired relation on a plurality of chassis comprising a series of operating stations, a machine adjustably mounted at each station having tools respectively adapted to apply components successively, means for simultaneously feeding the chassis singly from one station to the next in the series, and means actuated in response to the arrival of a chassis in operative position at each of the stations for operating the component applying tools of the several machines simultaneously.

3. Apparatus for assembling components in fixed relation on wiring boards comprising a series of operating stations respectively having instrumentalities adapted to operate on successive wiring boards to insert components, means for conveying a succession of wiring boards to one station after another in the series, and mechanism actuated by said conveying means for positioning the several wiring boards relatively to the operating instrumentalities of the respective stations.

4. Apparatus for assembling components in fixed relation on wiring boards comprising a series of stations respectively having instrumentalities for operating on and/or treating a wiring board, conveyor means including a guideway adapted to conduct a succession of wiring boards to and from successive stations of the series, means at each station operative to disassociate successive wiring boards from the conveyor means and position them relatively to said instrumentalities, and means at each station responsive to operation of all of said instrumentalities for reassociating the wiring boards with said conveyor means.

5. Apparatus for assembling components on wiring boards, each of said boards being mounted on a pallet having spaced guide projections, comprising a series of stations respectively having instrumentalities for operating on and/or treating a wiring board, conveyor means including a guideway adapted to receive said guide projections and conduct the pallet to and from successive stations of the series, means at each station for disassociating the pallet from the conveyor means upon arrival thereat, and mechanism at each station for locating the guide projections of a disassociated pallet with respect to said guideway to fix the position of the mounted wiring board with respect to said instrumentalities.

6. In apparatus for sequentially conveying a plurality of work holders to and through a series of operating stations, each of said work holders having a pair of spaced projections, guide means adapted to receive said projections and extending to and through areas respectively adjacent to the work zones of said stations, said guide means including in each of said areas a pair of offset positioning portions, and means at each station for arresting in its adjacent pair of offset positioning portions said work holder projections whereby the work is held in desired relation in each work zone.

7. In apparatus for sequentially conveying a plurality of work holders to and through a series of component applying machines, each of said work holders having a marginal portion provided with a pair of upstanding projections, guide means including a channel for receiving the projections of successive work holders to conduct them to and through the series of machines, a widthwise and a lengthwise stop associated with the channel adjacent to each machine, and means responsive to the arrival of a work holder at each machine for thrusting the projections of the several work holders against their adjacent stops whereby a work holder is clamped in fixed position at each machine.

8. Apparatus as set forth in claim 7 and further characterized by the provision of means responsive to the clamping of the work holders at their respective machines for effecting simultaneous operation of the latter.

9. In apparatus for sequentially conveying a plurality of pallets to and through a series of operating stations, each of said pallets having means for detachably mounting a wiring board in fixed relation thereon, means for conveying the pallets to and through the series of stations, means at each station for cooperating with successive pallets to disassociate them from the conveyor means, and automatic clamping means for holding the disassociated pallets in desired relation to the stations.

10. Assembly apparatus for carrying a plurality of work mounting pallets to and through a series of operating stations comprising means for conveying said pallets in succession to and through the series of stations, means at each station for cooperating with successive pallets to disassociate them from the conveyor means, automatic clamping means for holding the disassociated pallets in relation to the stations, the last-mentioned means including spaced pallet positioning stops at each station, a control member movable relatively to the stations of the series, clamping members respectively having operative connection with said control member and arranged to be moved thereby yieldingly to engage the disassociated pallets to clamp them against the adjacent stops, power means for actuating the control member, and a circuit for controlling operation of said power means, said circuit including a switch at each station arranged to be actuated by the arrival thereat of a pallet, said switches being connected in series to signal for operation of said power means upon arrival of all pallets at their stations whereby the clamping members are simultaneously operated.

11. Apparatus as set forth in claim 10 and further characterized in that circuits are provided for respectively controlling operation of said stations, said station controlling circuits including a switch arranged to be actuated by operation of said clamping members.

12. Apparatus for assembling components in fixed relation on chassis mounted on pallets comprising a series of operating stations, means for conveying pallets in succession to the successive stations of the series, means adjacent to each station and to the conveyor means for disassociating successive pallets from the latter, spaced abutments adjacent to each station arranged to be engaged by the successively disassociated pallets to determine their widthwise and lengthwise positions, and means for simultaneously clamping the positioned pallets at each station against said abutments.

13. Apparatus for assembling components on chassis mounted on pallets comprising a series of operating stations, means for conveying pallets in succession to the successive stations of the series, means adjacent to each station and to the conveyor means for disassociating successive pallets from the latter, spaced abutments adjacent to each station arranged to be engaged by the successively disassociated pallets to determine their widthwise and lengthwise positions, means for simultaneously clamping the positioned pallets at each station against said abutments, and means responsive to operation of all of the stations for unclamping the pallets to release them for further conveyance.

14. Apparatus for assembling components on wiring boards mounted on pallets comprising a series of component applying machines, means for conveying pallets in succession to the successive machines of the series, means adjacent to each machine for positioning and clamping successive pallets thereat, the last-mentioned means including spaced abutments arranged to be engaged by the successive pallets to determine the relative position of each with respect to the adjacent machine, and mechanism actuable by the pallets being positioned to thrust the successive pallets at that machine against the adjacent positioning abutments.

15. Assembly apparatus comprising a series of stations for operating upon work mounted on pallets, each having formed thereon a pair of spaced locating lugs, conveyor means for conducting the pallets successively to and through said operating stations, said conveyor means including a guideway for receiving the locating lugs on the pallets, a pair of widthwise positioning stops and a lengthwise positioning stop arranged at each station adjacent to the guideway, and means responsive to the arrival of a pallet at each station of the series for locating both lugs of the respective pallets against each adjacent widthwise positioning stop and one lug of each pallet against the adjacent lengthwise positioning stop.

16. Assembly apparatus comprising a series of operating stations, conveyor means for conducting work mounting pallets successively to and through said operating stations, each of said pallets having a trigger projection, means at each station for disassociating successive pallets from the conveyor means, a pair of positioning stops arranged at each station to be engaged by successive pallets being disassociated from said conveyor means, and electrically controlled mechanism operable by the trigger projections of the pallets being disassociated for simultaneously clamping the latter against said stops.

17. Assembly apparatus comprising a series of operating stations, conveyor means for conducting work mounting pallets successively to and through said operating stations, each of said pallets having a trigger projection, means at each station for disassociating successive pallets from the conveyor means, a pair of positioning stops arranged at each station to be engaged by successive pallets being disassociated from said conveyor means, and electrically controlled mechanism operable by the trigger projections of the pallets being disassociated for simultaneously clamping the latter against said stops, said mechanism including a clamping member at each station arranged yieldingly to be moved into engagement with a disassociated pallet, a power operated control member operatively connected to said clamping members and by which the latter are simultaneously actuated, a circuit for controlling operation of said control member, and a switch operating arm at each station arranged to be actuated by the trigger projection of the pallet thereat to close said circuit.

18. Apparatus as set forth in claim 17 and further characterized in that means associated with the respective stations is responsive to completion of their respective operating cycles simultaneously to release the clamped pallets for travel on said conveyor means.

19. Assembly apparatus comprising a series of operating stations, conveyor means including a pair of spaced endless belts for feeding rectangular work mounting pallets successively to and through the operating stations, a cam arranged at each station adjacent to one belt to be engaged by the corresponding margins of successive pallets as they are fed to elevate them partially from said conveyor means, pallet positioning stops at each station, means at each station for moving said pallets transversely of their direction of feed to clamp them against said stops, and a cam arranged at each station adjacent to the other belt to be engaged by the corresponding opposite margins of the transversely moving pallets completely to elevate them from said belts before the pallets are clamped.

20. Apparatus as set forth in claim 19 and further characterized in that a spring loaded detent associated with each station is arranged to be energized upon engagement therewith of a transversely moved pallet being clamped, and mechanism responsive to operation of all of said stations which is effective to release said clamping means whereby said spring loaded detent is de-energized to return the pallet to said conveyor means for travel to the succeeding station.

21. Assembly apparatus comprising a series of operating stations, conveyor means for feeding work supporting pallets successively from one station to the next, conveyor loading mechanism for releasing an empty pallet on to said conveyor means when another pallet has been discharged from the series of stations, and means automatically responsive to the accumulation of a selected number of pallets discharged from the series of stations for causing said conveyor loading mechanism to be inoperative.

22. Assembly apparatus comprising a series of operating stations, continuously driven conveyor means for feeding work pieces successively to and through the series of stations, automatic means for depositing a work piece on the conveyor means ahead of said series of stations when another work piece is discharged therefrom, and means responsive to the accumulation of a selected number of work pieces discharged from the series of stations for causing the work piece depositing means to be inoperative.

23. Assembly apparatus comprising continuously driven spaced conveyor belts, a series of operating stations to and through which said belts are adapted to convey successive work pieces, a guideway extending continuously on opposite sides of said stations and adapted to receive corresponding portions of said work pieces to guide the latter between stations, a pair of spaced stops at each station offset from the guideway, one of said stops being arranged to determine the widthwise and longitudinal position of successive work pieces and the other being arranged to determine their widthwise position, and means responsive to the arrival of a work piece at each station for simultaneously clamping said work pieces against their respectively adjacent pair of stops.

24. In apparatus for assembling and/or treating electrical equipment, a pallet for carrying a wiring board in fixed relative position thereon comprising an open, flat-sided frame, said frame including at least three internally projecting spaced portions arranged to engage an under side of a wiring board, and two of said projecting portions respectively having a locating pin adapted to be received by a positioning hole in the wiring board.

25. In apparatus for assembling components on a wiring board, a board carrying pallet comprising an open rectangular frame including at least three internally spaced projecting portions arranged to engage an under side of the board, two of said projecting portions having a locating pin adapted to be received by a positioning hole in the wiring board, and a spring clip adjacent to each locating pin to facilitate mounting of the board thereon.

26. In apparatus for sequentially conveying a plurality of pallets to and through a series of operating stations, each of said pallets being formed with an open portion affording accessibility to work carried thereon and having three projections spaced in the general direction of travel, a multi-sectioned conveyor frame, guide means mounted on the frame for cooperating with that pair of said pallet projections which is most remote to guide the pallet with respect to the stations, and pallet positioning and clamping mechanism arranged at each station to be operated by the intermediate one of said pallet projections.

27. In apparatus for assembling and/or treating electrical equipment, means comprising a pair of parallel, spaced endless belts for conveying a flat rectangular pallet on which a wiring board is detachably mounted in fixed relation, said pallet being open and having oppositely disposed marginal portions adapted normally to be engaged by said belts respectively, one of said marginal portions having a projection on its external edge face, means for driving the belts normally to convey the pallet along a path extending through a series of operating stations, and a cam in said path adjacent to one of the belts and arranged to be engaged by said edge face projection to shift the pallet from said one belt toward an operating station.

28. Assembly apparatus comprising a series of operating stations, means for feeding a plurality of work mounting pallets horizontally and successively along a generally straight path to and through said stations, a pair of fixed cams at each station arranged one adjacent to each side of the feeding means, and means at each station for imparting to successive pallets a sidewise movement transverse to the direction of feed, one of said cams being disposed to be engaged by successive pallets partially to disassociate them from the feeding means during their feeding movement and the other of said cams being disposed to be simultaneously engaged by the successive pallets during their transverse sidewise movement to complete their disassociation from said feeding means.

29. Assembly apparatus comprising a series of operating stations, means including a guideway for feeding a plurality of work mounting pallets successively to and through said stations, said guideway being adapted to accommodate spaced lugs on said pallets arranged in fixed relation to the work, spaced abutments at each station adjacent to the guideway and respectively adapted to be engaged by a lug of each pallet, and mechanism at each station responsive to arrival of a pallet to disassociate it from said feeding means and thrust its lugs against said stops, respectively.

30. Apparatus for assembling components on wiring boards mounted on pallets comprising a series of operating stations, means for feeding a plurality of board-carrying pallets successively to and through said stations, means at each station actuable by a fed pallet to arrest it in detached condition from said feeding means, mechanism responsive to operation of all of said arresting means for operating said stations automatically, and means responsive to operation of all of said stations for returning the arrested pallets to said feeding means.

31. Apparatus for assembling components on wiring boards mounted on pallets, each having an external trigger portion, comprising a series of operating stations, means for feeding a plurality of board-carrying pallets successively to and through said stations, a pair of pallet positioning abutments at each station, and power operated means for clamping said pallets simultaneously against the pairs of abutments, respectively, said power operated means including a clamping arm arranged at each station to engage the trigger portion to hold a pallet against a pair of said abutments, a member to which said clamping arms are yieldingly connected and by which they are operated, a circuit for controlling movement of said member, and a switch at each station arranged to be actuated by arrival of a pallet trigger portion, said switches being connected in series in said circuit.

32. Apparatus for assembling components on wiring boards mounted on pallets, each having an external trigger portion, comprising a series of operating stations, means for feeding a plurality of flat board-carrying pallets successively to and through said stations, a pair of pallet positioning abutments at each station, power operated means for clamping said pallets simultaneously against the pairs of abutments, respectively, said power operated means including a clamping arm arranged at each station to engage the trigger portion to hold a pallet against a pair of said abutments, a member to which said clamping arms are yieldingly connected and by which they are operated, a circuit for controlling movement of said member, a double throw switch at each station arranged to be actuated in one direction by a pallet trigger portion, said switches being connected in series in said circuit, a circuit for controlling operation of said stations, and automatic means responsive to operation of said clamping means for actuating each double throw switch in another direction to close said station controlling circuit.

33. Apparatus for assembling components on wiring boards comprising a series of operating stations, means for feeding a plurality of detachable, independent board mounting pallets successively to and through said stations, each pallet detachably holding its board in fixed position thereon, a component inserting machine at one or more of said stations adapted to apply the leads of successive components to selected portions of the boards on successive pallets, and means cooperative with said feeding means for simultaneously positioning and then clamping the pallets to position their boards at the component inserting machine stations for the reception of components.

34. Apparatus for assembling components on wiring boards comprising a series of operating stations, means for feeding a plurality of board mounting pallets successively to and through said stations, means for disassociating successive pallets at each station from said feeding means and bringing them to rest in fixed relation thereto, and means responsive to the operation of the last-mentioned means for effecting simultaneous operation of said stations.

35. Apparatus for assembling components on wiring boards mounted on pallets comprising a series of component inserting stations, continuously operative means for feeding board mounting pallets simultaneously and successively to and through said stations, means for introducing a pallet to said feeding means as the succession of pallets is to be fed, means for positioning successive pallets at each station for the reception of a component, and a member operatively connected to said positioning means for actuating the latter, said member having operative connection with said pallet introducing means.

36. In combination with a machine having instrumentalities for applying electrical components, means for conveying wiring boards successively to and through the operating zone of said machine, means for locating the successive wiring boards in approximately the same relation with respect to said conveyor means for travel in their own plane, and means associated with said station responsive to the arrival of a board thereat for disassociating it from the conveyor means and accurately registering the board in predetermined relation to said instrumentalities.

References Cited in the file of this patent

UNITED STATES PATENTS

| | | |
|---|---|---|
| 1,511,401 | Davis | Oct. 14, 1924 |
| 1,650,278 | Kingsbury | Nov. 22, 1927 |
| 2,167,934 | Wright | Aug. 1, 1939 |
| 2,304,437 | Bell | Dec. 8, 1942 |
| 2,341,014 | Blair | Feb. 8, 1944 |

FOREIGN PATENTS

| | | |
|---|---|---|
| 114,582 | Germany | Oct. 24, 1900 |